(12) United States Patent
Buer et al.

(10) Patent No.: US 7,290,134 B2
(45) Date of Patent: Oct. 30, 2007

(54) ENCAPSULATION MECHANISM FOR PACKET PROCESSING

(75) Inventors: Mark L. Buer, Gilbert, AZ (US); Timothy R. Paaske, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 824 days.

(21) Appl. No.: 10/352,423

(22) Filed: Jan. 28, 2003

(65) Prior Publication Data

US 2004/0158710 A1 Aug. 12, 2004

Related U.S. Application Data

(60) Provisional application No. 60/437,603, filed on Dec. 31, 2002.

(51) Int. Cl.
*H04L 29/00* (2006.01)
*H04L 9/00* (2006.01)

(52) U.S. Cl. ..................... 713/160; 713/153
(58) Field of Classification Search ............... 713/160; 726/14, 15
See application file for complete search history.

(56) References Cited

U.S. PATENT DOCUMENTS

| 6,438,612 | B1 * | 8/2002 | Ylonen et al. ............. 709/249 |
| 7,003,118 | B1 * | 2/2006 | Yang et al. ................ 380/287 |
| 7,017,042 | B1 * | 3/2006 | Ziai et al. ................. 713/161 |
| 7,058,973 | B1 * | 6/2006 | Sultan ...................... 726/12 |
| 2002/0181400 | A1 * | 12/2002 | Zheng et al. .............. 370/235 |
| 2002/0184487 | A1 * | 12/2002 | Badamo et al. ........... 713/153 |
| 2002/0188839 | A1 * | 12/2002 | Noehring et al. .......... 713/153 |
| 2002/0191790 | A1 | 12/2002 | Anand et al. |
| 2004/0143734 | A1 * | 7/2004 | Buer et al. ................ 713/153 |

FOREIGN PATENT DOCUMENTS

WO  WO 02/102026 A2  12/2002

OTHER PUBLICATIONS

Communication from the European Patent Office dated May 4, 2005; European Search Report for Application No. 03029792.
Kent, S., et al. "Security Architecture for the Internet Protocol." Internet, Nov. 1998.

* cited by examiner

*Primary Examiner*—Matthew B Smithers
(74) *Attorney, Agent, or Firm*—Sterne Kessler Goldstein & Fox, P.L.L.C.

(57) ABSTRACT

Systems and methods are disclosed for processing data packets. Such a system may generate a header for a session and repeatedly use that header to generate packets for the session. Packets may be processed by a host processor and an associated security processor. When the security processor generates packets for the session it may prepend a header from the host processor onto packets, rather than independently generate the header.

29 Claims, 18 Drawing Sheets

ENCAPSULATION MECHANISM FOR PACKET PROCESSING

CROSS REFERENCE TO RELATED APPLICATIONS

This application claims the benefit of U.S. Provisional Patent Application No. 60/437,603, filed Dec. 31, 2002, the contents of which are hereby incorporated by reference.

FIELD OF THE INVENTION

The invention relates generally to the field of data communications and, more particularly, to systems and methods for processing data packets.

BACKGROUND

The transmission of data over a data network typically involves sending messages between application programs ("applications") executing on host processors connected to the data network. In a packet network such as the Internet a host processor encapsulates data from an application into data packets to send the data over the packet network. When a host processor receives the data packet from the packet network, the host processor unencapsulates the packets to obtain the data. The host processor then provides the data to the appropriate application.

The process of encapsulating data into a packet involves adding information such as source and destination addresses to the data to facilitate transmission of the data over the packet network. Conventionally, the encapsulation process follows a particular packet data protocol. A typical protocol defines the structure of a packet such as the location of the source address and the destination address in the packet. A protocol also may define procedures for routing the packet over the network using those addresses. For example, the components in a data network may use the destination address to determine where to send the packet. The recipient application may use the source address to determine which application sent the packet.

Common protocols used in conjunction with the Internet include Internet protocol ("IP"), transmission control protocol ("TCP"), user datagram protocol ("UDP") and Internet control message protocol ("ICMP"). In general, IP relates to controlling data transfer between host processors, TCP relates to establishing sessions to transfer data between applications, UDP provides a faster but less reliable data transfer mechanism than TCP, and ICMP relates to error messages and network traffic statistics.

Data transmitted over public networks such as the Internet may be encrypted to prevent unauthorized parties from intercepting the data. Typically, a device connected to the network encrypts data using a cipher algorithm and an encryption key. The device sends the encrypted data over the network to another device that decrypts the data using the cipher algorithm and a decryption key.

Several standards have been developed to facilitate secure data transmission over data networks. For example, the Internet security protocol ("IPsec") may be used to establish secure host-to-host pipes and virtual private networks over the Internet. IPsec defines a set of specifications for cryptographic encryption and authentication. IPsec also supports several algorithms for key exchange, including an Internet Key Exchange ("IKE") algorithm for establishing keys for secure sessions established between applications.

Some systems include dedicated devices that offload some of the processing operations from the host processor. For example, a network processor may be used to perform some of the packet processing operations. A cryptographic accelerator may be used to perform the cipher algorithms to offload encryption/decryption processing from the host processor.

In a typical system, the primary data flow is from the host processor to the network processor then to the network, and vice-versa. In addition, the network processor routes packets that will be encrypted or decrypted to the cryptographic accelerator. The cryptographic accelerator then routes the encrypted or decrypted packets back to the network processor. In personal computer-based systems, the host processor, network processor and cryptographic accelerator typically are connected via a peripheral component interface ("PCI") bus.

There is a perpetual need for increased operating speed and implementation flexibility in data communications systems. On the one hand, developers are continually creating applications that require increasingly greater amounts of data to be sent between system components. On the other hand, end users want their applications to run faster which, in turn, often requires that associated data transfers be performed more quickly.

In an attempt to address the need for faster data communications, various groups have developed standards that specify high-speed data transfers between components of data communication systems. For example IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s.

The development of these standards and the ever increasing need for faster data transfers create a need for techniques and circuits capable of achieving high data transfer rates. Moreover, there is an ever-present economic motivation to achieve such results in a cost effective and adaptable manner. Accordingly, a need exists for improved packet processing techniques to support data transmission over data networks.

SUMMARY

The invention relates to methods and associated systems for processing data packets. For example, a device constructed according to one embodiment of the invention may generate a header for a session and repeatedly use that header to generate packets for the session.

In one embodiment, packets are processed by a host processor and an associated security processor. The host processor negotiates with other host processors to establish sessions for applications executing on the host processor. Once a session is established, the host processor generates and terminates packets for the session. The security processor handles encryption and decryption for the host processor and performs packet processing. The host processor may send a header for each session to the security processor so that the security processor may use the header to generate packets for a session. For example, when the security processor generates packets for the session it may prepend the header from the host processor onto packets, rather than independently generate the header.

In one embodiment, the host processor generates the header when it establishes a session and, if applicable, generates security association information for the session. The host processor sends the header to the security processor in a configuration packet.

When the security processor in this embodiment receives the configuration packet, the security processor stores the header in a data memory for use in processing packets for that session. For example, when the security processor receives a packet from the host processor, the security processor may identify the session associated with the packet and, based on the session, retrieve the appropriate header from the data memory. Next, the security processor prepends the header onto the packet, performs its own packet processing and, in some embodiments, modifies one or more fields in the header. In this way, the security processor may efficiently generate the header for the packet.

A security processor constructed according to the invention may be configured as an in-line security processor that it processes packets that pass through the device, as the packets are being routed to/from the data network. Thus, packets from the network passing through the device are intercepted, authenticated and/or encrypted and/or decrypted as necessary, then forwarded back out onto the network.

In one embodiment of the invention the security processor includes at least one gigabit MAC/PHY interface to interface with a gigabit Ethernet network.

One embodiment of a system constructed according to the invention includes a gigabit Ethernet controller in combination with a gigabit security processor. The gigabit security processor performs IPsec operations. The gigabit Ethernet controller provides the network interface for a host processor and may also perform IP and TCP processing for the host processor. In this case, the gigabit Ethernet controller may send data flow information to the security processor to assist the security processor in performing IPsec operations. For example, the flow information may include an address of security association data (e.g., encryption/decryption keys) associated with each data flow. In one embodiment, the flow information is sent in a packet header that encapsulates the packet to be encrypted/decrypted.

In one embodiment of the invention a security processor may be configured using packets sent over the data network. For example, the security processor may be configured with IPsec configuration packets. Hence, a host processor may manage the security processor over a network. This may eliminate a need for an external processor for configuring the security processor.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF ILLUSTRATIVE EMBODIMENTS OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
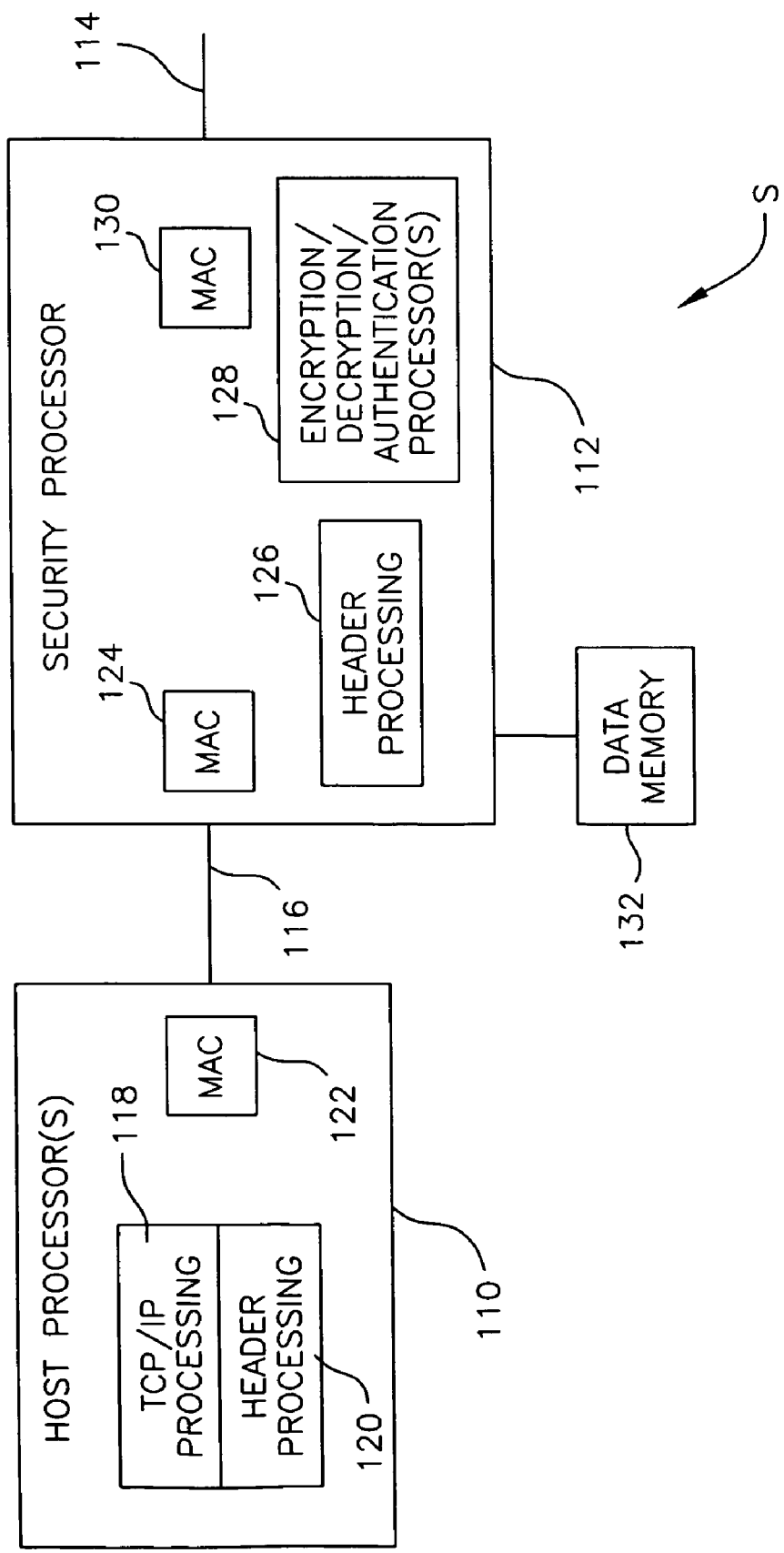
FIG. 1 is a block diagram of one embodiment of a packet processing system constructed in accordance with the invention.

FIG. 1 is a block diagram of one embodiment of a packet processing system S constructed according to the invention. An application executing on a host processor 110 establishes a connection with another application (not shown) via a packet network 114. To provide secure data transmission, a security processor 112 encrypts, decrypts and/or authenticates some of the data the application sends to and receives from the other application over the packet network 114. As used herein, the term security processor refers to one or more processing components that encrypt, decrypt or authenticate data or perform any combination of these operations.

The embodiment of FIG. 1 communicates over the packet network 114 using the TCP/IP protocols. To this end, the host processor 110 includes TCP/IP processing 118 that establishes TCP sessions with other applications. The TCP/IP processing 118 then encapsulates session data being sent over the network and unencapsulates session data received from the network 114.

In addition, the host processor 110 communicates with the security processor 112 via a packet link 116. Thus, the host processor 122 includes a media access controller 122 that communicates with a media access controller 124 in the security processor 112. Another media access controller 130 in the security processor 112 communicates with the network 114.

The security processor supports the IPsec protocol. For example, the security processor includes one ore more encryption/decryption/authentication processor(s) 128 that encrypt TCP/IP packets received from the host processor 110. The security processor 112 encapsulates the encrypted packets as IPsec packets for transmission over the network 114.

In accordance with conventional practice, the encryption/decryption/authentication processor 128 uses security associations in conjunction with its encryption/decryption/authentication algorithms. For example, a security association may specify an encryption algorithm to be used to encrypt data from a particular application. A security association also may include an encryption key used by the encryption algorithm.

In practice, an application may establish several connections with other applications via the packet network 114. To maintain the security of these connections, the security processor may use different security associations to encrypt the data for each of these connections.

In accordance with one embodiment of the invention, header processing 120 in the host processor 110 may generate a header that the security processor 112 may use to generate packets for a session. For example, the header processing 120 may generate a header for each session and send this header to the security processor. If a session is a secure session, after the host processor 110 generates TCP/IP packets for the session, the TCP/IP packets are sent to the security processor 112 for encryption. When the security processor 112 receives the TCP/IP packets, header processing 126 in the security processor 112 identifies the header that is to be used for that session, as necessary. Then, the security processor 112 may generates IPsec packets for the session by prepending the header onto the TCP/IP packets.

Figure 2:
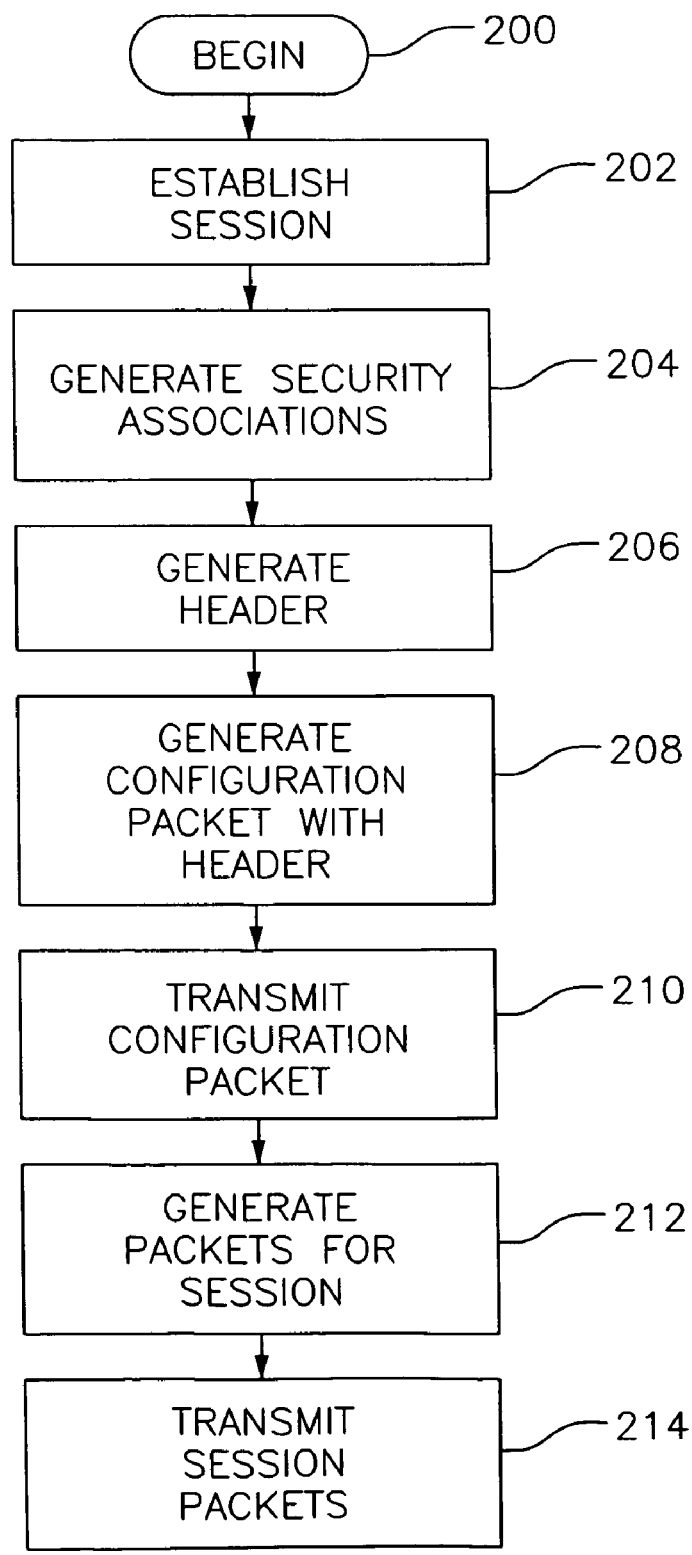
FIG. 2 is a flowchart representative of one embodiment of operations that may be performed in accordance with the invention.
Figure 3:
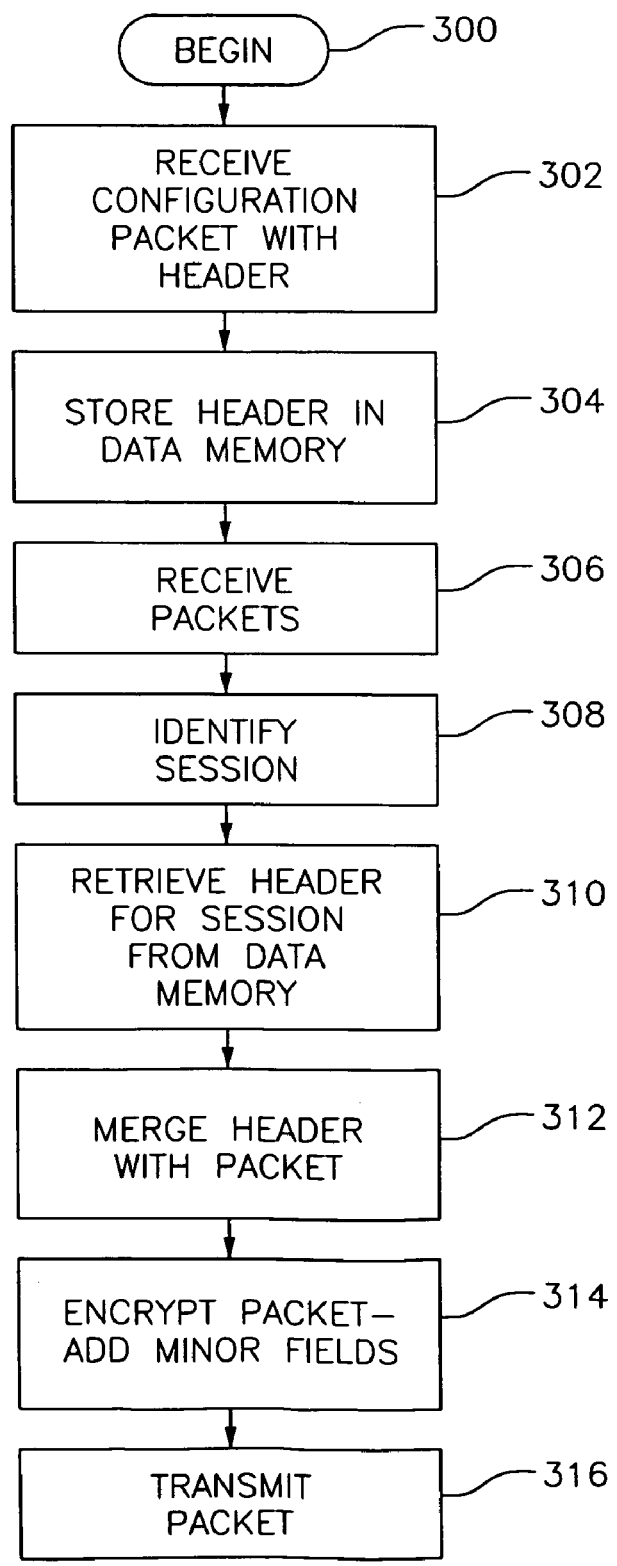
FIG. 3 is a flowchart representative of one embodiment of operations that may be performed in accordance with the invention.

Operations of the system S of FIG. 1 will be treated in more detail in conjunction with the flowcharts in FIGS. 2 and 3. FIG. 2, beginning at block 200, represents operations that may be performed by the host processor 110. Blocks 202-204 represent operations related to establishing session. Blocks 206-210 represent operations related to generating the headers and sending them to the security processor 112. Block 212-214 represent operations related to generating session packets.

As represented by block 202, applications executing on the host processor 110 establish sessions with other applications via the packet network 114. For secure sessions, this may include generating security association information for each session (block 204).

As represented by block 206, the host processor 110 may generate a header for each session for use by the security processor 112. In one embodiment, the header processing 120 generates the header at the time the TCP/IP processing 118 establishes a session and, if applicable, generates security association information for the session. In this case, the information needed by the header processing to generate the header is readily available from the TCP/IP processing 118.

As represented by block 208, the host processor 110 may then generate a configuration packet that includes the header. The host processor 110 sends the header to the security processor 112 in a configuration packet over the packet link 116 (block 210).

As represented by blocks 212 and 214, when the applications communicate via the sessions, the host processor generates packets for each session and sends the packets to the packet network 114 via the security processor 112.

FIG. 3, beginning at block 300, represents operations that may be performed by the security processor 112. Blocks 302-304 represent operations related to receiving the headers from the host processor 110. Blocks 306-316 represent operations related to processing session packets received from the host processor 110.

As represented by block 302, when the security processor 112 receives the configuration packet, the header processing 126 extracts the header from the configuration packet. Then, as represented by block 304, the header processing 126 stores the header in a data memory 132.

When the security processor 112 receives a session packet from the host processor 110 (block 306), the security processor 112 may identify the session associated with the packet (block 308. Then, as represented by block 310, based on the session, the security processor 112 may retrieve the header associated with that session from the data memory 132. Next, the security processor 112 prepends the header onto the packet (block 312), performs IPsec packet processing and, as needed, modifies one or more fields in the header (block 314). The security processor then sends the IPsec packet over the packet network to the appropriate destination (block 316).

Figure 4:
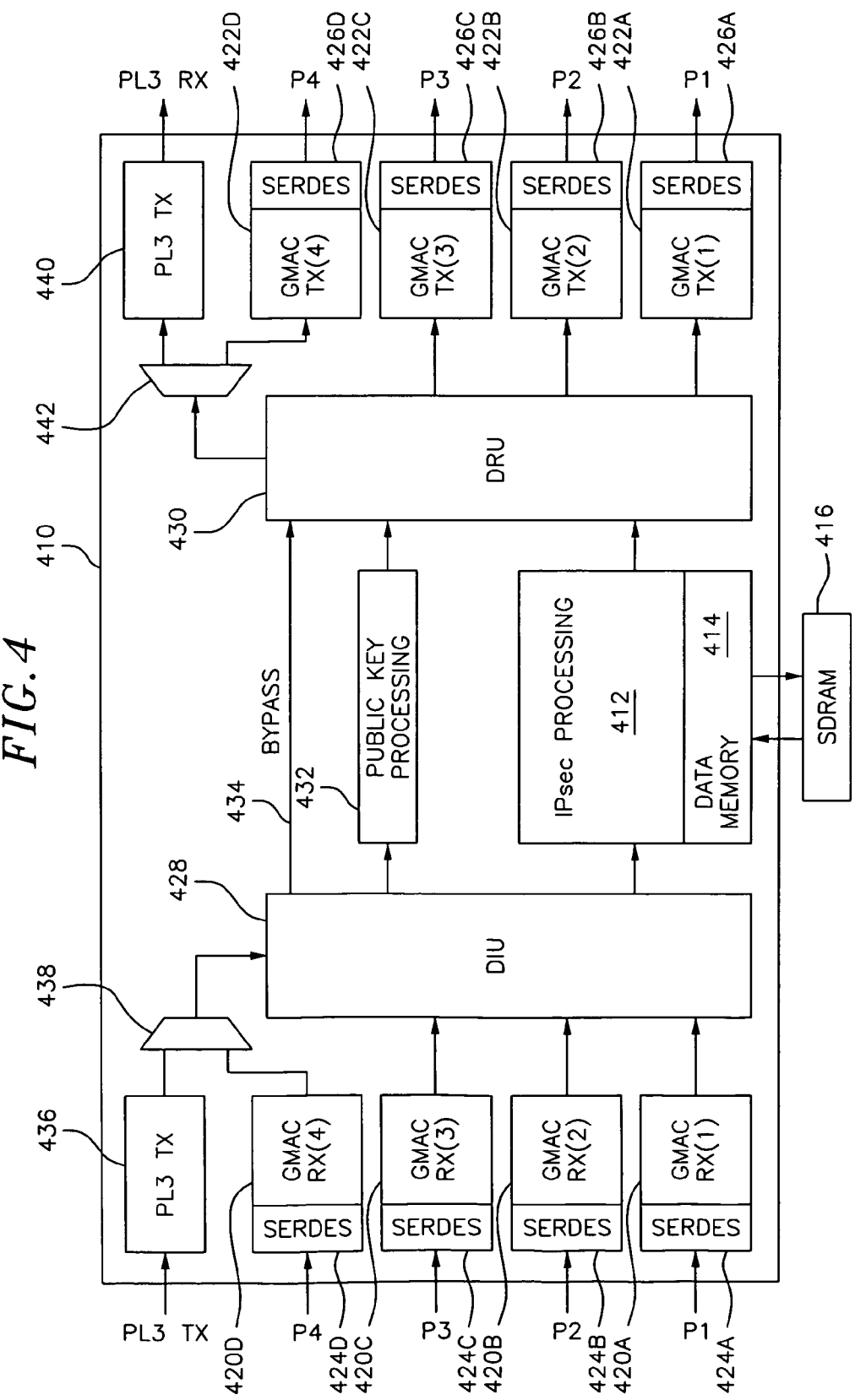
FIG. 4 is a block diagram of one embodiment of a security processor constructed in accordance with the invention.

FIG. 4 illustrates one implementation of a Gigabit security processor 410. This implementation includes quad 10/100/1000 GMACs (receivers 420A-D, transmitters 422A-D) with integrated SERDES (receivers 424A-D, transmitters 426A-D). Each of the GMACs may be configured to interface with a host side network or a line side network. The network inputs and outputs for the GMACs are labeled P1-P4.

The Gigabit security processor 410 also includes a PL3 interface. The input to the PL3 receiver 436 is labeled PL3 TX. The output of the PL3 transmitter 440 is labeled PL3 RX.

One of the GMACs may be swapped with a PL3 interface. On the receive side, this is accomplished by a multiplexer 438 that selects either the signal from PL3 receiver 436 or the GMAC RX(4) 420D to be sent to a data input unit ("DIU") 428. On the transmit side, a demultiplexer 442 sends output data from a data routing unit ("DRU") 430 to either the PL3 transmitter 440 or the GMAC TX(4) 422D.

The DIU 428 manages packet flow from the receiver inputs into the processing path of the Gigabit security processor 410 and may extract and process header information. Packets may be routed to a bypass path 434, for example, when no security processing is necessary. This would be the case for non-IPsec packets flowing through the Gigabit security processor 410. Packets may be routed to a public key processing component 432. Packets also may be routed to an IPsec processing component 412 based, for example, on analysis of packet header information as discussed herein. The Gigabit security processor 410 includes an internal data memory 414 as well a memory interface component to access external data memory such as a serial dynamic random access memory ("SDRAM") 416. Additional details of one embodiment of the processing path of a Gigabit security processor are described in U.S. patent application Ser. No. 09/610,798 filed on Jul. 6, 2000 and entitled "DISTRIBUTED PROCESSING IN A CRYPTOGRAPHY ACCELERATION CHIP," the entire contents of which are hereby incorporated by reference.

The DRU 430 manages data from the processing path of the Gigabit security processor 410 to be sent to the device outputs. Thus, the DRU 430 routes packets to the GMAC transmitters 422A-C and the demultiplexer 442.

Figure 5A:
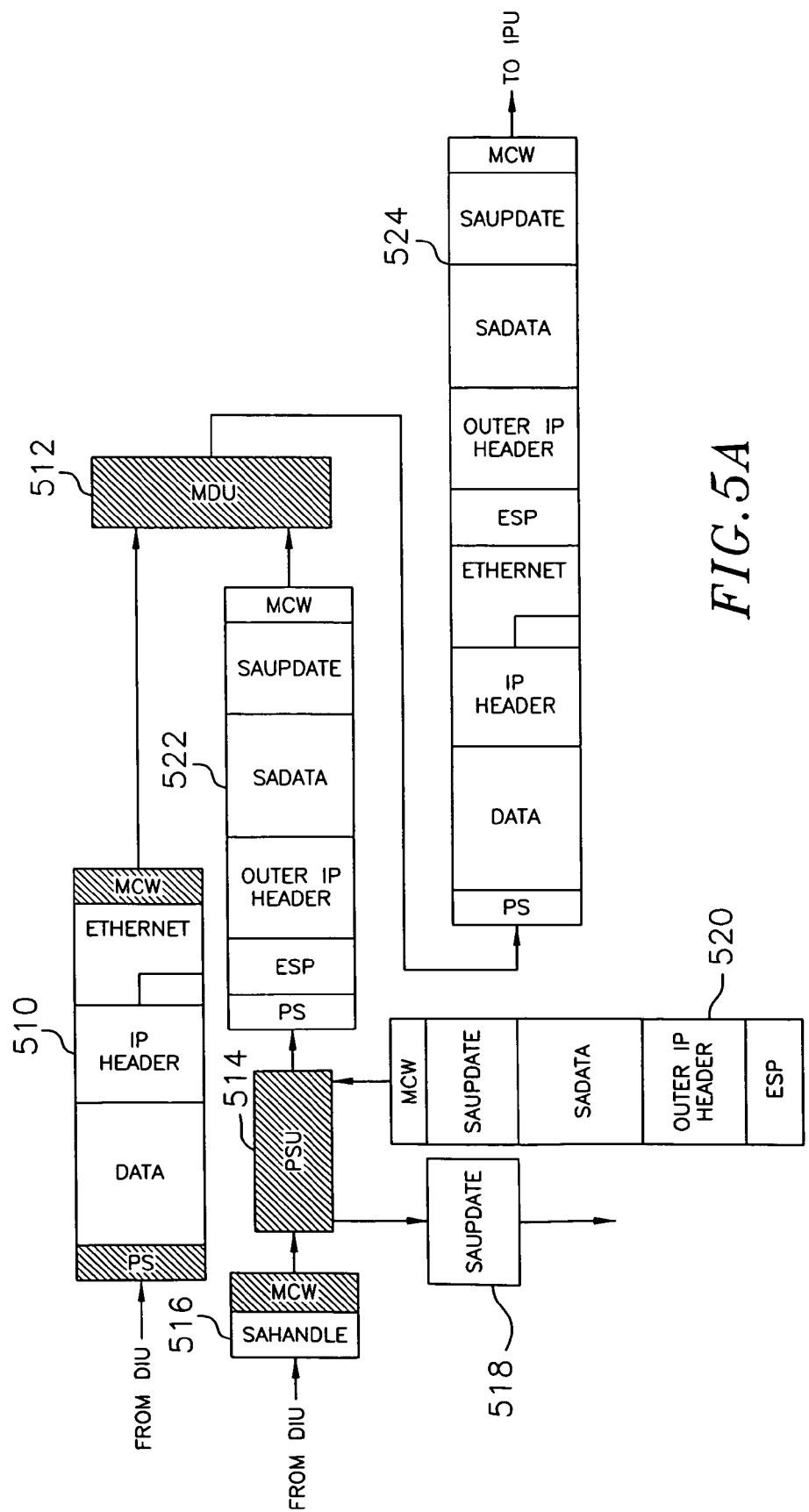
FIGS. 5A and 5B are block diagrams of one embodiment of data flow in a system constructed in accordance with the invention.
Figure 5B:
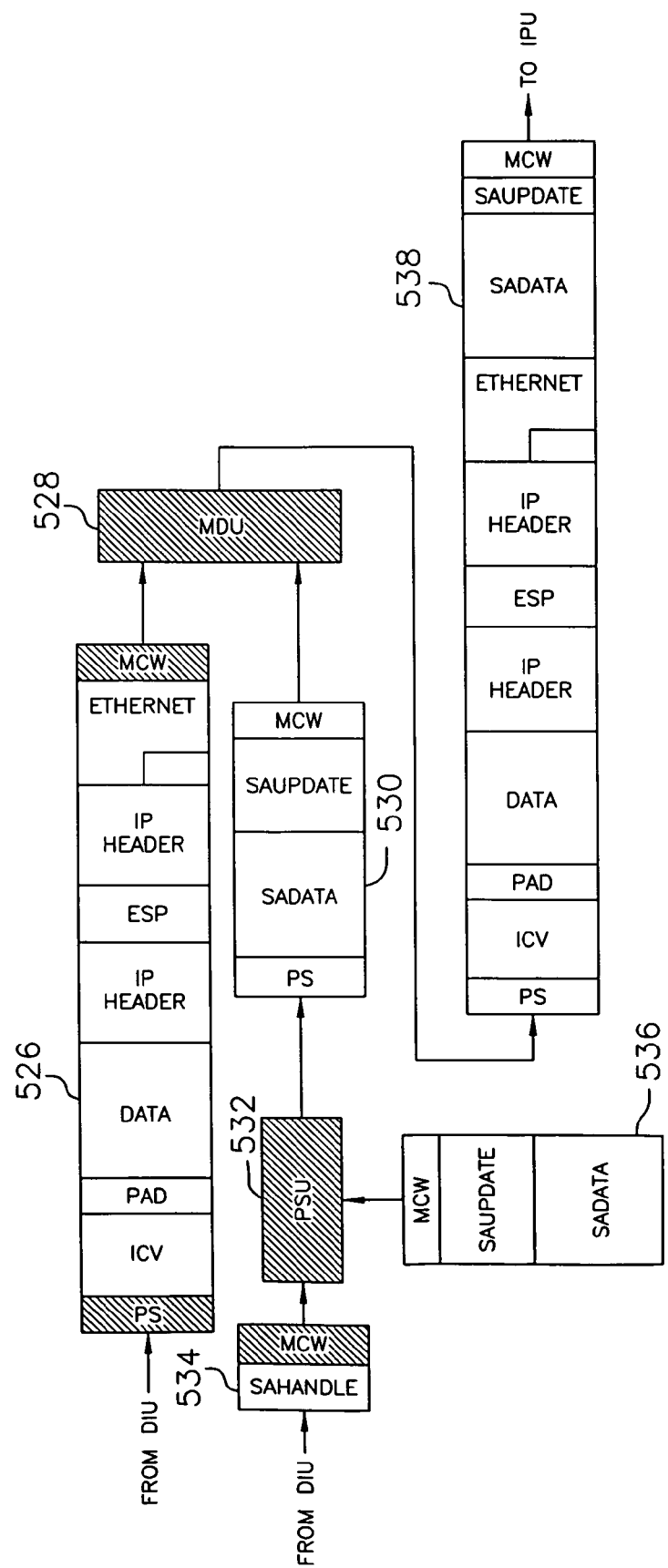

FIGS. 5A and 5B depict one embodiment of packet processing operations for the security processor. In FIG. 5A, the security processor includes a policy lookup unit 514 and a merge data unit ("MDU") 512. The policy lookup unit ("PSU") 514 receives packet information from the data input unit ("DIU") 428 to retrieve, when applicable, the header to append to an incoming packet. The merge data unit 512 merges the header with the incoming packet from the data input unit 428.

The MDU provides a traffic merge functionality between the PSU and the DIU. The MDU uses the two management control words ("MCWs") from the PSU to merge data from both the PSU and the DIU (bitwise OR of the MCWs). The MDU gives priority to the locally fetched data fields when both MCWs indicate the presence of the field.

The BufferData field is inserted after the Ethernet header for Tunnel mode packets and after the IP header for Transport Mode packets. The Ethernet header is treated as separate portion of the BufferData field when EthernetMode=1 (i.e. the Ethernet header can be replaced by data in local memory) and is always used to replace the original Ethernet header.

The MDU merges any errors generated by the PSU into the PacketStatus of the packet received from the DIU for the requested MCW.

Figure 6:
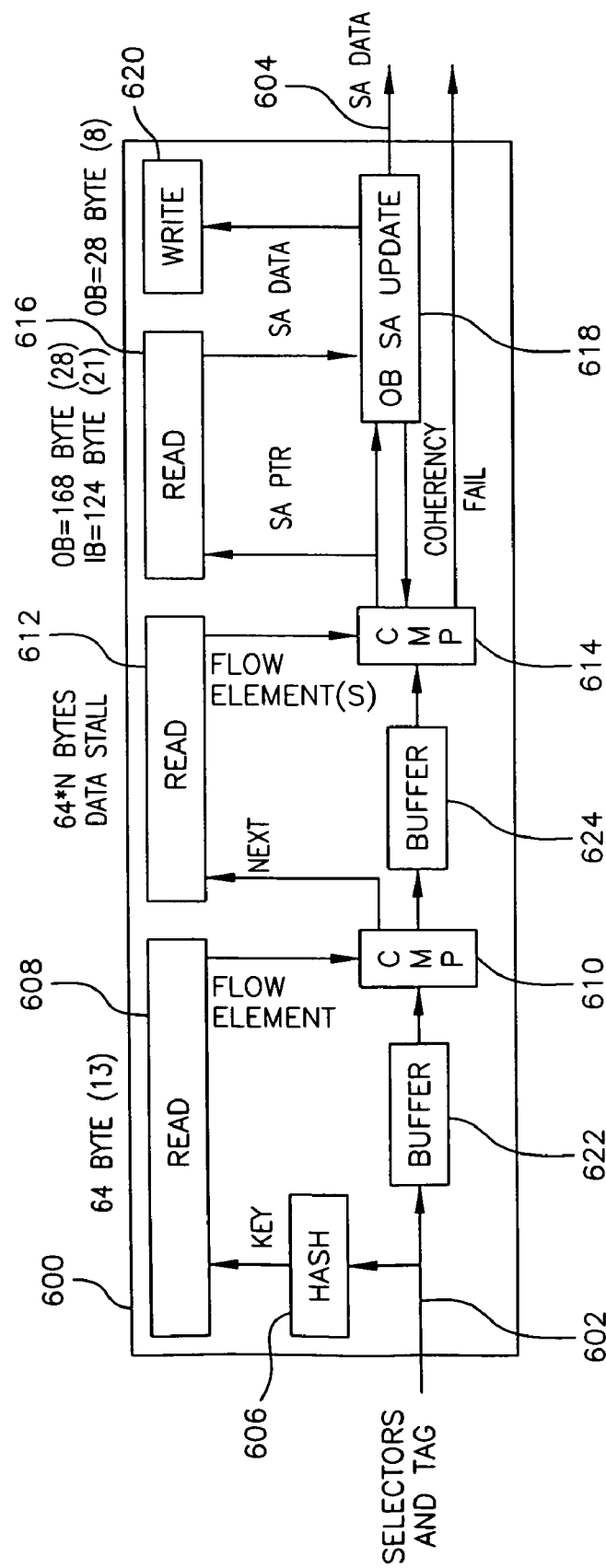
FIG. 6 is a block diagram of one embodiment of a policy lookup unit constructed in accordance with the invention.

FIG. 6 depicts one embodiment of a policy lookup unit 600. The PSU reads information from memory 608 and prepends the information to the packet. The location in memory of the SA Data Structure can be specified directly or by selectors in the SAHandle field as represented by input 602. The PSU may use the selectors to search a hash based flow table 606 to determine the location of SA Data Structure. This architecture may be used for both inbound, outbound and non-Ipsec packets, providing an extremely flexible mechanism that allows each packet to be classified into an established flow.

The memory is managed by the host processor using memory access packets. The memory access packets are serviced by the PSU in order with all packet requests. The PSU issues memory read/write commands as well as flow update commands.

The flow updates are special access packets for which the PSU calculates the hash entry point into the flow table. The PSU searches out the previous flow selectors (match found) or the next empty position in the flow table (new flow). It then updates the flow table with the new flow selector values.

The PSU block receives a set of selectors in the SAHandle from the DIU along with the MCW. The PSU hashes the selectors to generate an address unless the address is provided directly. The SPI is typically used directly as the entry into the hash table for inbound IPsec packets (indicated in the SAHandle). In a controlled system, the SPI may be used directly as the address of the SA Data Structure (no flow table required for inbound IPsec packets in this case, however the SA Data Structure size must be fixed to one of four preset values for all inbound security associations when using this method).

The resulting hash address is used to read the flow element from a hash table (different base address for separate hash tables). The flow element contains one or more flow entries with selectors that are used to match the original packet selectors.

A compare unit 610 in the PSU compares the selectors to the ones found in the flow entries in sequential order. If the selectors are not found within the base flow element, the rest of the flow elements are fetched by the PSU. These flow elements are also searched in order until a match is found. If no match is found, the packet is flagged with an error 2.

In one embodiment the PSU can process 5 Mpps for flow lookups when the flow entry is found in the first flow element (3 entries for IPv4, 1 entry for IPv6). When the PSU goes beyond the first flow element, data may be stalled in the pipeline (i.e. could look into 2 elements for 128 byte packets or 4 elements for 256 byte packets at line rate).

Once the selectors have been resolved (i.e. the flow is found), the PSU compare block 614 fetches the SA Data Structure from the SA_PTR location in the flow entry with the matching selectors.

The policy data (SPData) for an outbound type packet is compared to the selectors in the SAHandle by the PSU. If the policy data comparison fails, any further processing of the packet is not done by the security processor (the PSU does not update the security association data on a policy failure for outbound packets). Since the PSU does not drop packets, it simply provides the MDU with an error flag for this packet. The MDU will add the error flag to the packet status. The PSU always consumes the SPData field for an outbound packet.

If the SAUpdate field is present for an outbound packet type, the OB SA Update block 618 in the PSU will increment the sequence number and modify the byte count of the packet of the SAUpdate field and write the result back to memory 620. The PSU manages the coherency of this operation locally using the address of the SA Data Structure as exclusive. Since the byte count is based on the "protected" byte count value, the PSU adds the packet length plus a fixed value (indicated in the SAUpdate field) per packet that it processes.

The PSU enforces the soft and hard expiration indications for lifetime on all packets (notifications passed to the ISU for expiration generation on inbound packets). The PSU enforces the soft and hard expirations of lifebyte and sequence number exhaustion for outbound packets. The PSU constructs the expiration message sending it through the MDU datapaths.

The packet length (TOTAL_LEN) and IP header length (HDR_LEN) are passed to the PSU from the DIU with the selectors in the SAHandle field (automatically generated by the security processor). The header length is subtracted from the protected byte count for Transport ESP packets indicated in the SAData field.

The protected byte count equations are the following:
HDR_LEN=Length of Header+Length of Options
IF (packet.version=IPv4) then
TOTAL_LEN=packet.total_length
ELSE IF (packet.version=IPv6) then
TOTAL_LEN=packet.payload_length
ENDIF
IF (SAData.transport=TRUE) then
AH_IPV4_BC=TOTAL=LEN+SAData.FixedBC
AH_IPV6_BC=HDR_LEN+TOTAL_LEN+SAData.FixedBC
ESP_IPV4_BC=TOTAL_LEN+SAData.FixedBC−HDR_LEN
ESP_IPV6_BC=TOTAL_LEN+SAData.FixedBC
ELSE
AH_IPV4_BC=TOTAL_LEN+SAData.FixedBC
AH_IPV6_BC=HDR_LEN+TOTAL_LEN+SAData.FixedBC
ESP_IPV4_BC=TOTAL_LEN+SAData.FixedBC
ESP_IPV6_BC=HDR_LEN+TOTAL_LEN+SAData.FixedBC
ENDIF
The AH protected byte count is used for an AH-ESP bundle.

The PSU consumes the SAHandle field that it received from the DIU. It provides the data fetched from memory on the correct channel to the targeted MDU, as represent by line 604.

Figure 7:
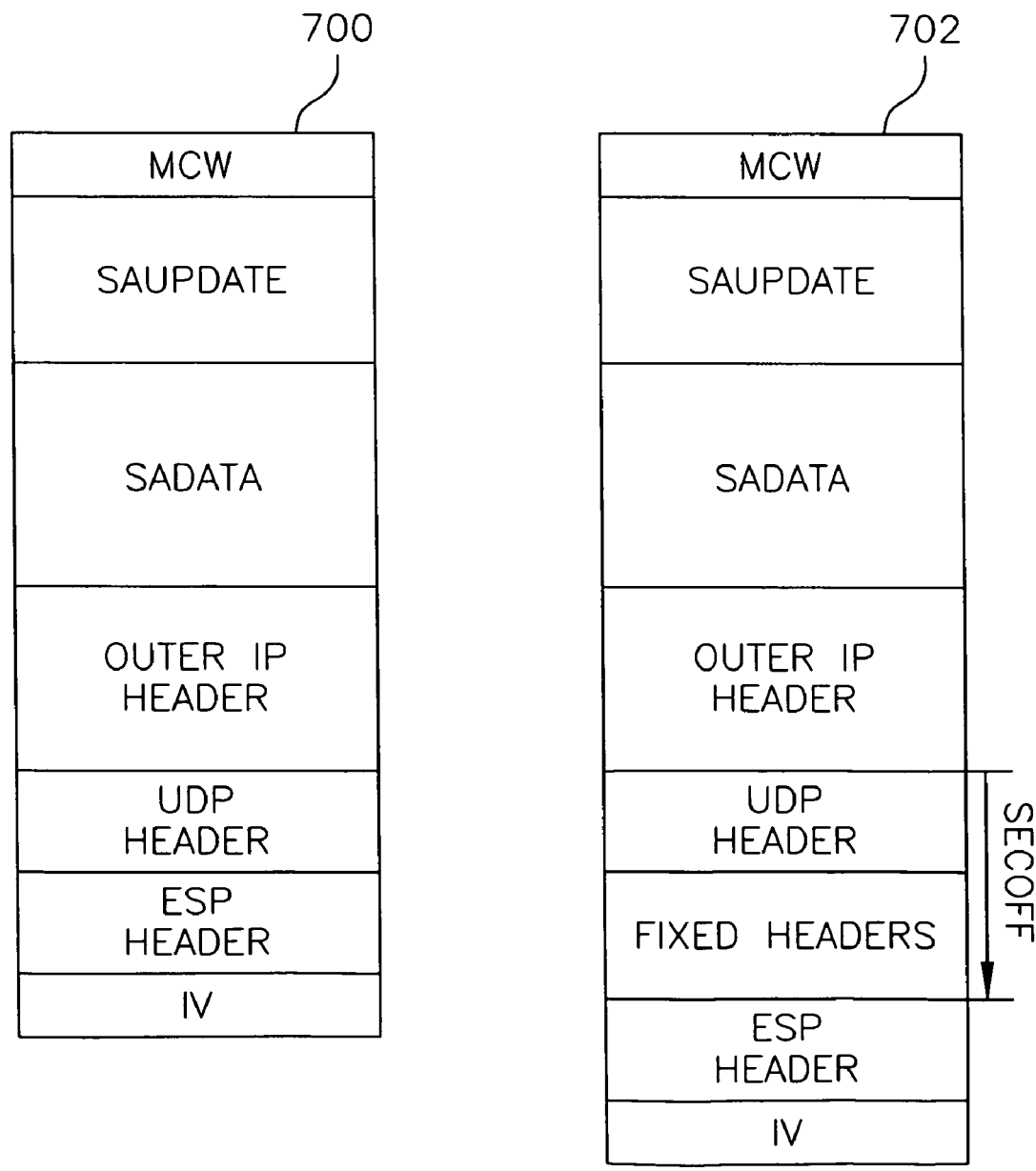
FIG. 7 is a representation of one embodiment of data structures in accordance with the invention.

FIG. 7 depicts one embodiment of security association data structures for tunnel mode encapsulation. The security processor provides a flexible encapsulation mechanism by using a SA Data Structure fetch to prepend information to the original data packet. The SA Data Structure (see, for example, structures 700 and 702 in FIG. 7) is fetched from local memory and merged with the original packet by the "Merge Data Unit (MDU)". The host constructs the SA Data Structure in such a manner that it provides the necessary encapsulation for the packet. The security processor then modifies or constructs the variable fields of the encapsulated packet.

This mechanism is extremely flexible in allowing the host to do custom encapsulations that include changing Ethernet headers on a per flow basis. This section will provide a basic example of the SA Data Structure for encapsulation, but is not exhaustive.

The security processor SA Data Structure is constructed by the host in memory that is accessible by the security processor (i.e., local memory).

The structure includes an MCW that is used to indicate the fields that are present in the structure. The SA Data Structure would contain the SAData field for IPsec packets, but need not have an SAData field for IP packets.

Figure 8:
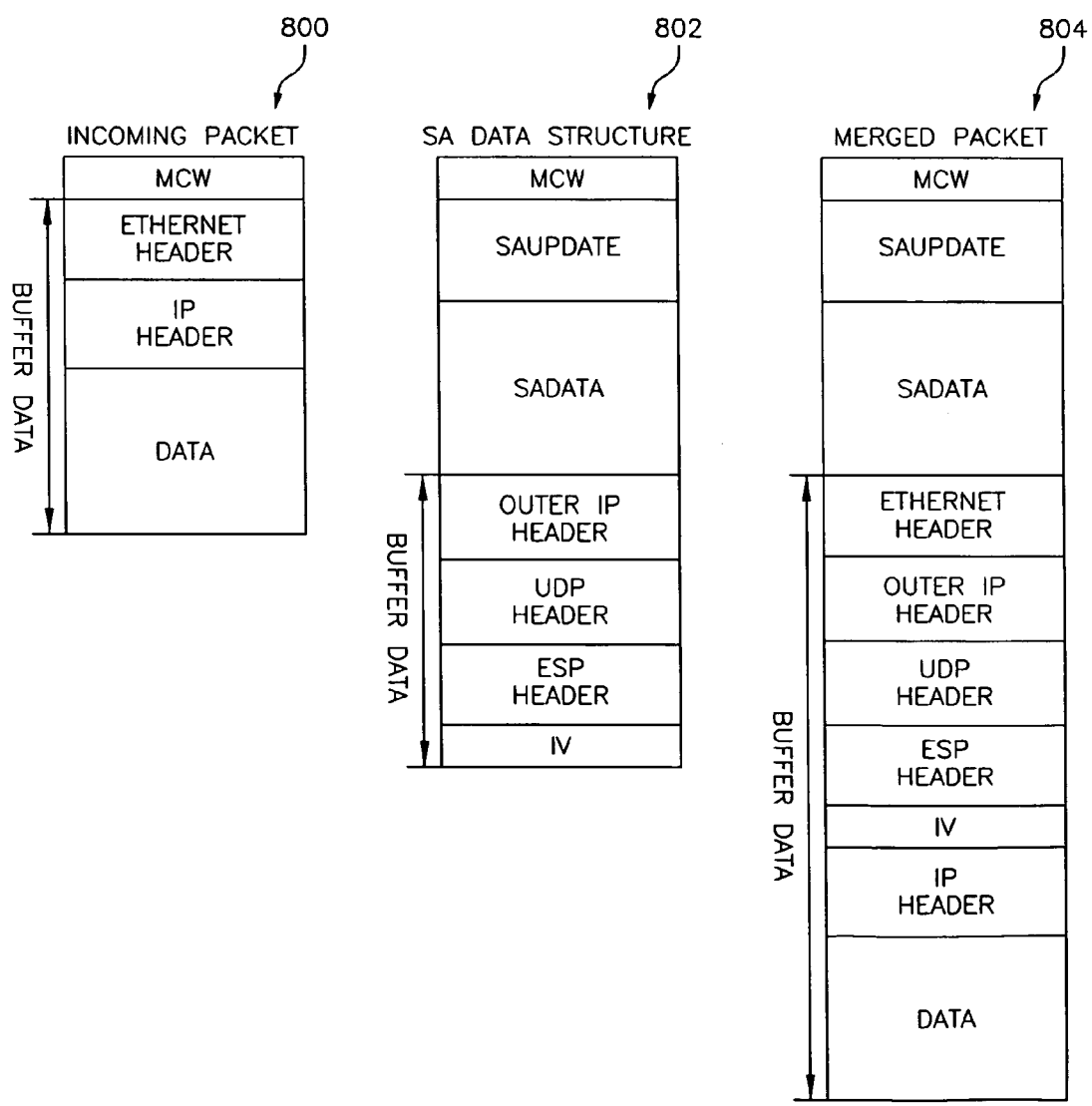
FIG. 8 is a block diagram of one embodiment of packet merging in a system constructed in accordance with the invention.

FIG. 8 depicts one embodiment of merge operations performed by the security processor for tunnel mode encapsulation. The Tunnel mode encapsulation is achieved by placing the outer IP header and the security header into the BufferData field of the SA Data Structure 802. For UDP encapsulation, the UDP header is also included in the BufferData field. The SECOFF value may be used to indicate the location of the security header within the packet.

The security processor merges the packet data 800 with the SA Data Structure 802 to construct an encapsulated packet 804. The BufferData field is placed after the Ethernet header of the incoming packet. The padding, NextHeader and ICV for ESP mode are constructed by the security processor.

A new Ethernet header may also be included in the BufferData field (not shown). The new Ethernet header present in the SA Data Structure would replace the Ethernet header of the incoming packet.

Figure 9:
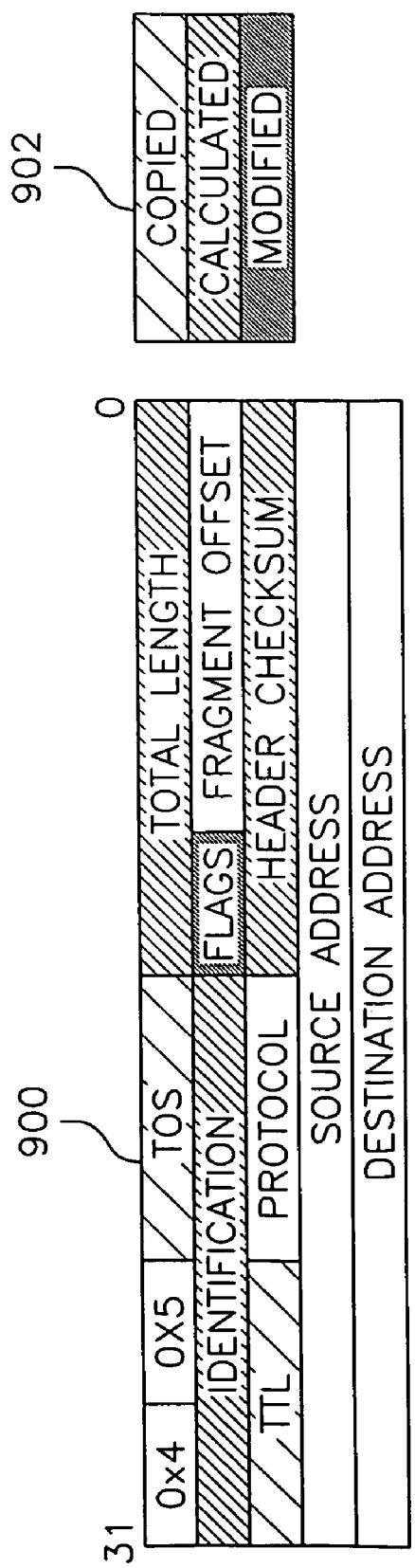
FIG. 9 is a representation of one embodiment of packet header fields in accordance with the invention.

FIG. 9 depicts one embodiment of packet header fields 900 for Ipv4 tunnel mode encapsulation. IPsec Tunnel mode uses an outer IP header to tunnel the inner packet. The outer IP tunnel mode headers are similar for both AH and ESP protocols with the PROTOCOL field being the only difference (selected by the host). This section describes how the security processor processes the encapsulated packets.

The host builds the outer IP header in the SA Data Structure when the security association is created. The following sections indicate how the security processor modifies this header on a per packet basis.

The outer header IP version is not affected by the inner header IP version. If the outer header is IPv4 then it is constructed as shown in FIG. 9 by the host (in the SA Data Structure).

The variable fields are modified or copied by the security processor as indicated by block 902 and the following paragraphs. All other fields are used directly as formatted on input.

Type of Service (TOS).

The SAData.Copy_TOS bit is used to determine if the inner header values are copied to the outer header. If the inner header is IPv4 and Copy_TOS=1, the TOS is copied from the inner IPv4 header TOS field. If the inner header is IPv6 and Copy_TOS=1, the traffic class is copied from the inner IPv6 header to the TOS field in the outer tunnel header. If Copy_TOS=0, then the value that was created by the host for this field is used directly (i.e. the security processor does not change the value). Whenever Copy_TOS=L, the outer tunnel header TOS byte (created by the host and stored in the SA Data Structure) must be zero.

Total Length.

The security processor will always re-calculate the Total Length field whenever the SAData.Cap_En bit is set. The Total Length field in the outer IP header (from SA Data Structure) reflects the amount of data that encapsulates the original packet (does not include Ethernet header nor the IPv6 fixed header of 40 bytes). The Total Length field is also updated when the SAData.

Pad_En bit is set to include the additional bytes of pad that were added to the packet.

Identification (ID).

The 16 bit identification field can be filled in using the global ID counter in the security processor within each IPU. Each IPU is given ⅛ of the total available 16 bit space (via upper 3 bits) to ensure that no values are repeated within $2^{\wedge}13$ packets.

Flags.

The SAData specifies whether to copy the Flags field from the inner header (DF_Copy). The clear or set don't fragment (DF) bit is determined by how the host built the header when DF_Copy=0. If inner header is IPv6 and the SAData specifies that the DF bit should be copied then the DF bit is set by the security processor (IPv6 fragmentation headers do not have the equivalent of the DF bit). Whenever DF_Copy=1, the outer tunnel header DF bit (created by the host and stored in the SA Data Structure) must be zero.

Fragment Offset.

The fragment offset must be zero for a tunnel packet (the security processor will not process outer header fragmented packets). The security processor will not fragment an outbound packet unless the Frag_En bit in SAData is set AND the outer header DF bit is not set.

Time to Live (TTL).

The SAData.Copy_TTL bit specifies if the TTL value is copied from the inner header or used directly as generated by the host. For an inner IPv6 header with Copy_TTL=1, the Hop Limit field is mapped directly to the TTL field. Whenever Copy_TTL=1, the outer tunnel header TTL field (created by the host and stored in the SA Data Structure) must be zero.

Protocol.

The Protocol field is specified as either ESP (50) or AH (51) by the host when constructing the header resulting in hex values of 0×32 or 0×33 respectively. In the case of an AH+ESP bundle, the AH value should be used since it is the outer encapsulation.

This field is not changed by the security processor.

If the value is UDP and SAData.UDP_En=1, the security processor will calculate the UDP header length. If SECOFF is not provided as part of the SA Data Structure, the security processor will assume the AH or ESP header (indicated via the SAData field) is located after an 8 byte UDP header (i.e. equivalent to a SECOFF value of 8 bytes).

The host may specify this value to other than UDP, ESP or AH. In this case, the SECOFF can be used for the security processor to locate the AH or ESP header.

Checksum.

The checksum value is calculated over the IPv4 header by the security processor based on the IPv4_Checksum bit in the SAData.

Source/Destination Address.

The source and destination addresses are ignored by the security processor except in the calculation of the checksum value.

Options.

The security processor supports options in the outer tunnel header stored within the SA Data Structure. The security processor does not modify these options. The security processor will automatically mute and restore these options for AH processing.

Figure 10:
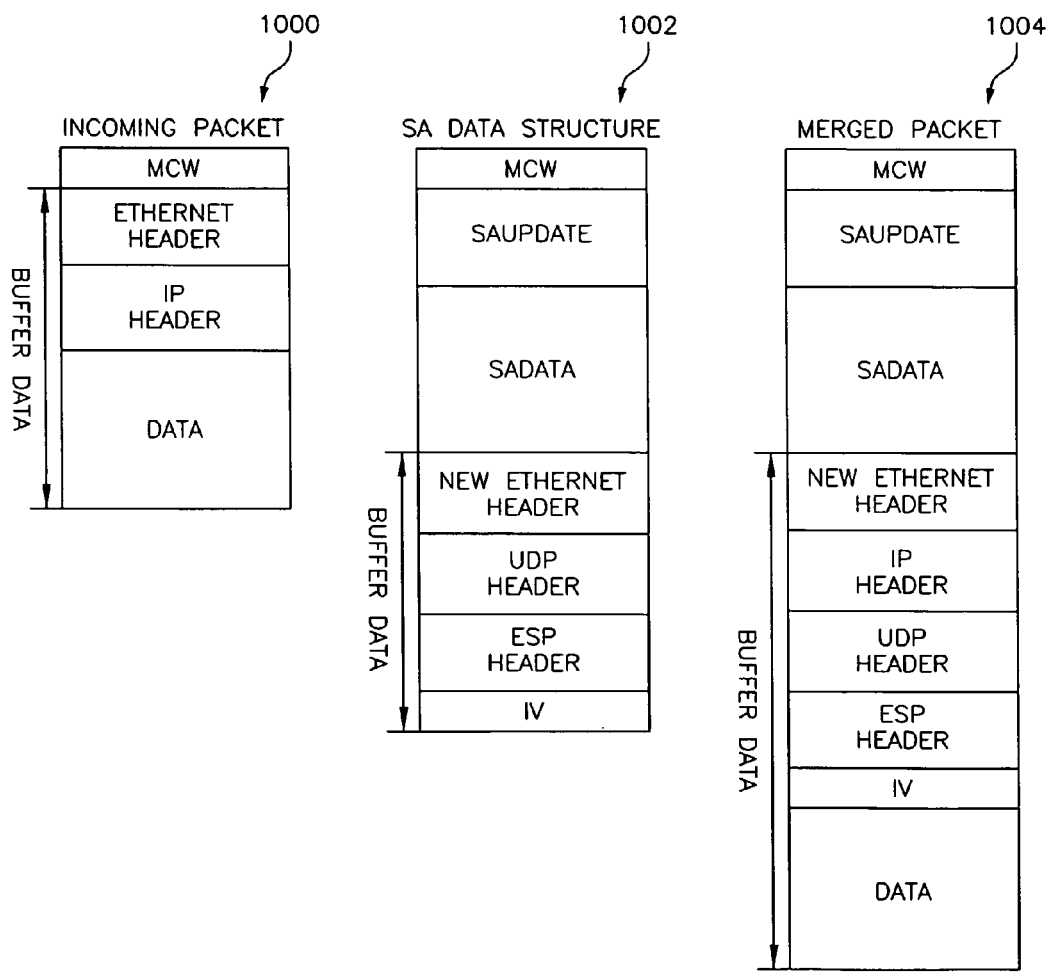
FIG. 10 is a block diagram of one embodiment of packet merging in a system constructed in accordance with the invention.

FIG. 10 depicts one embodiment of merge operations performed by the security processor for transport mode encapsulation. The Transport mode encapsulation is achieved by placing the security header in the BufferData field of the SA Data Structure 1002.

The BufferData field of the SA Data Structure for a Transport mode security association is placed after the initial IP header (including options) of the incoming packet 1000.

The security processor treats the Ethernet header (part of the BufferData field) as a separate field when merging the data from the incoming packet 1000 and the SA Data Structure 1002 to generate a merged packet 1004. The Ethernet header is placed at the beginning of the packet for both Tunnel and Transport modes.

Figure 11:
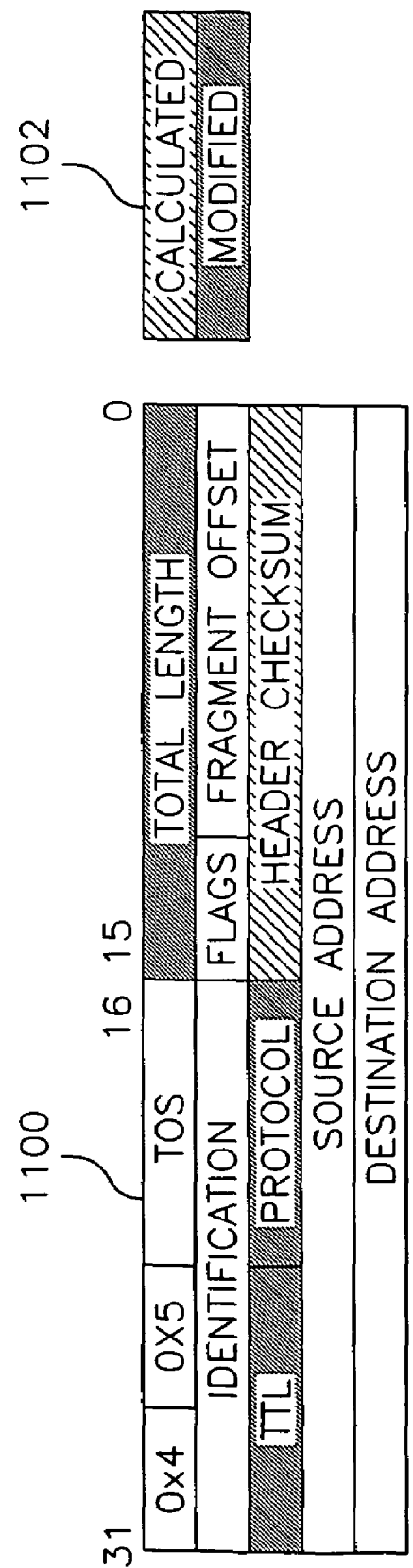
FIG. 11 is a representation of one embodiment of packet header fields in accordance with the invention.

FIG. 11 depicts one embodiment of packet header fields 1100 for Ipv4 transport mode encapsulation. For Transport mode packets, the security processor modifies the existing IP header while adding a security header to the packet.

The IP header modifications are similar for both AH and ESP protocols. This section describes how the security processor processes the encapsulated packets for Transport mode IPsec.

The modifications to the IP header for IPv4 Transport mode packets are shown shaded as represented by block 1102 in FIG. 11.

Total Length.

Table 33 indicates how the Total Length field is calculated for the different encapsulations by the host. The Total Length field must accurately represents the original packet length.

TABLE 1

Total Length Calculation for IPv4 Transport Mode

| TYPE | TOTAL LENGTH |
| --- | --- |
| AH | ip + ah = 24 + ip |
| ESP (encryption only) | ip + esp + iv + pad + 2 = 10 + iv + ip + pad |
| ESP (authentication only) | ip + esp + pad + 2 + icv = 22 + ip + pad |
| ESP | ip + esp + iv + pad + 2 + icv = 22 + iv + ip + pad |
| AH + ESP | ip + ah + esp + iv + pad + 2 = 34 + iv + pad |

Fragment Offset.

The fragment offset must be zero for an outbound Transport mode packet RFC2401 requires that transport mode packets be processed on the entire datagram.

Time to Live (TTL).

The security processor always decrement the packet TTL.

Protocol.

The security processor copies this field into the security header as required for AH, ESP or AH-ESP. The Protocol field is changed by the security processor to either ESP (50), AH (51) or UDP based on the SAData.UDP_En, SAData.AH and SAData.ESP bits. In the case of an AH+ESP bundle, the AH value is used since it is the outer encapsulation.

Checksum.

The checksum value is calculated over the IPv4 header by the security processor based on the IPv4_Checksum bit in the SAData.

Source/Destination Address.

The source and destination addresses are ignored by the security processor except in the calculation of the checksum value and policy verification.

Options.

The security processor supports options in the transport IP header or the original packet or they may be added via the SA Data Structure.

The security processor does not modify these options. The security processor will automatically mute and restore these options for AH processing.

Figure 12:
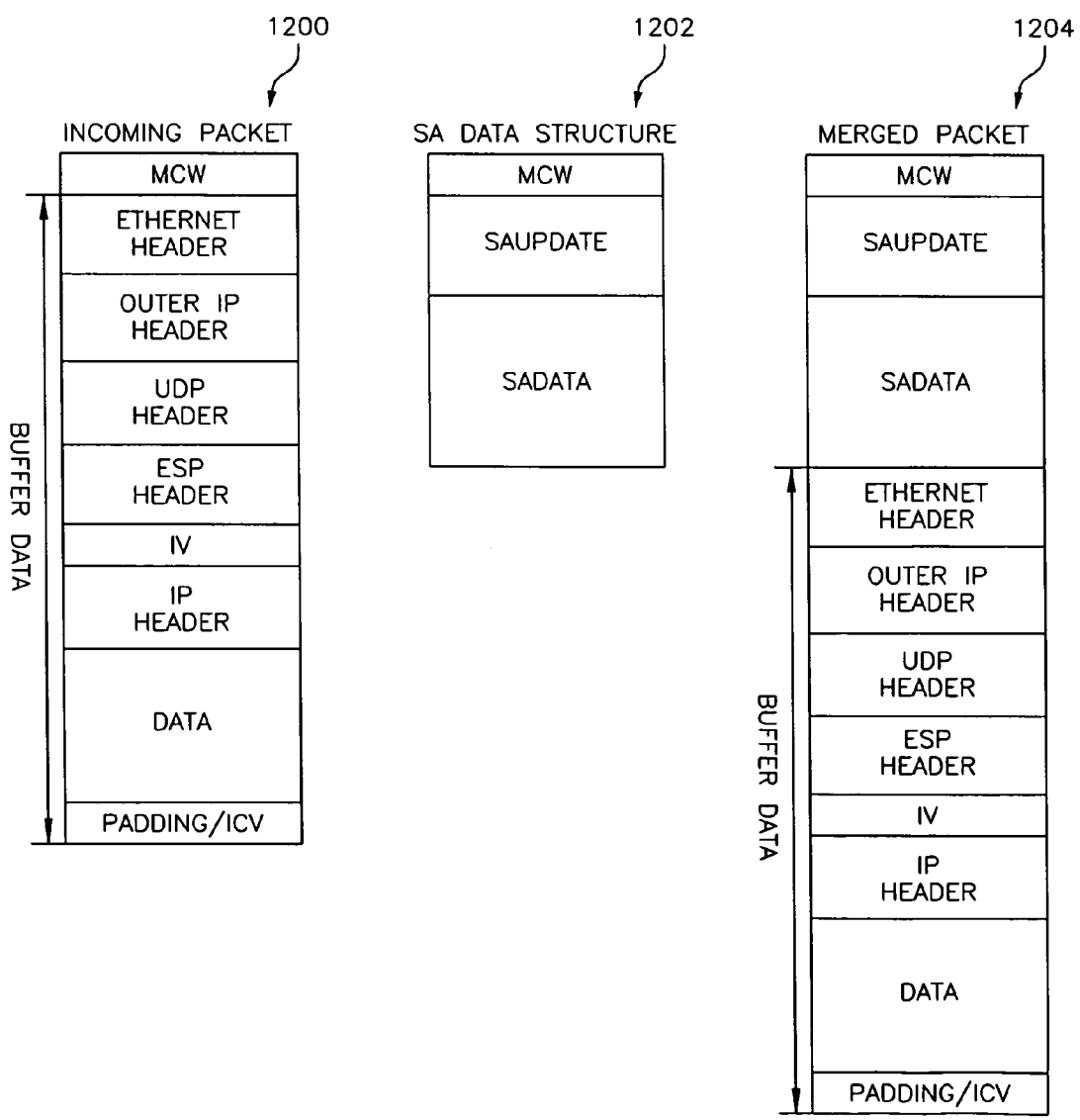
FIG. 12 is a block diagram of one embodiment of packet merging in a system constructed in accordance with the invention.

FIG. 12 depicts one embodiment of merge operations performed by the security processor for tunnel mode decapsulation to generate a merged packet 1204. The security processor decapsulation logic uses a similar mechanism described above for Encapsulation. The SA Data Structure 1202 is prepended to the packet 1200 by the security processor prior to packet processing. The prepended data provides the SAData information along with the policy data required to completely process the packet. The merge operation for inbound packets occurs in the same manner as outbound packets. Typically, the only BufferData for an inbound packet would be an optional new Ethernet header.

The merge processing for inbound tunnel mode processing is shown in FIG. 12. It follows the same rules as outbound merge processing. Similarly, transport mode merge processing for inbound packets follows the same rules as outbound processing in that the BufferData field is inserted after the IP header with the exception of the Ethernet header.

The security processor is required to locate the UDP encapsulating header (if present) and the security header in the packet. Additionally, it must process non-IPsec traffic which might include IKE packets. The security processor uses the information in the security association to decode the packet contents. The SAData field indicates the mode of the packet (transport or tunnel) as well as the format of the packet fields.

Figure 13A:
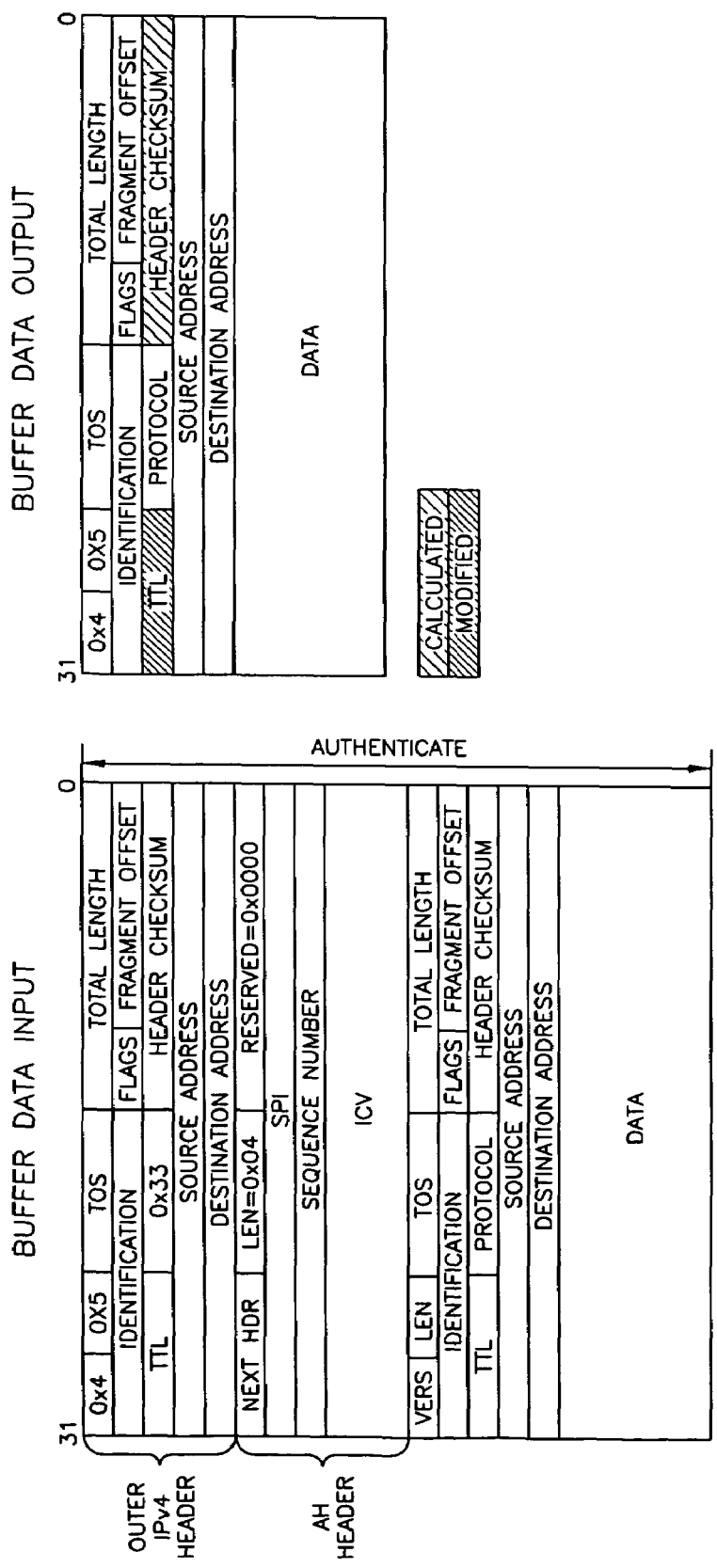
FIGS. 13A and 13B are representations of embodiments of packet header fields in accordance with the invention.
Figure 13B:
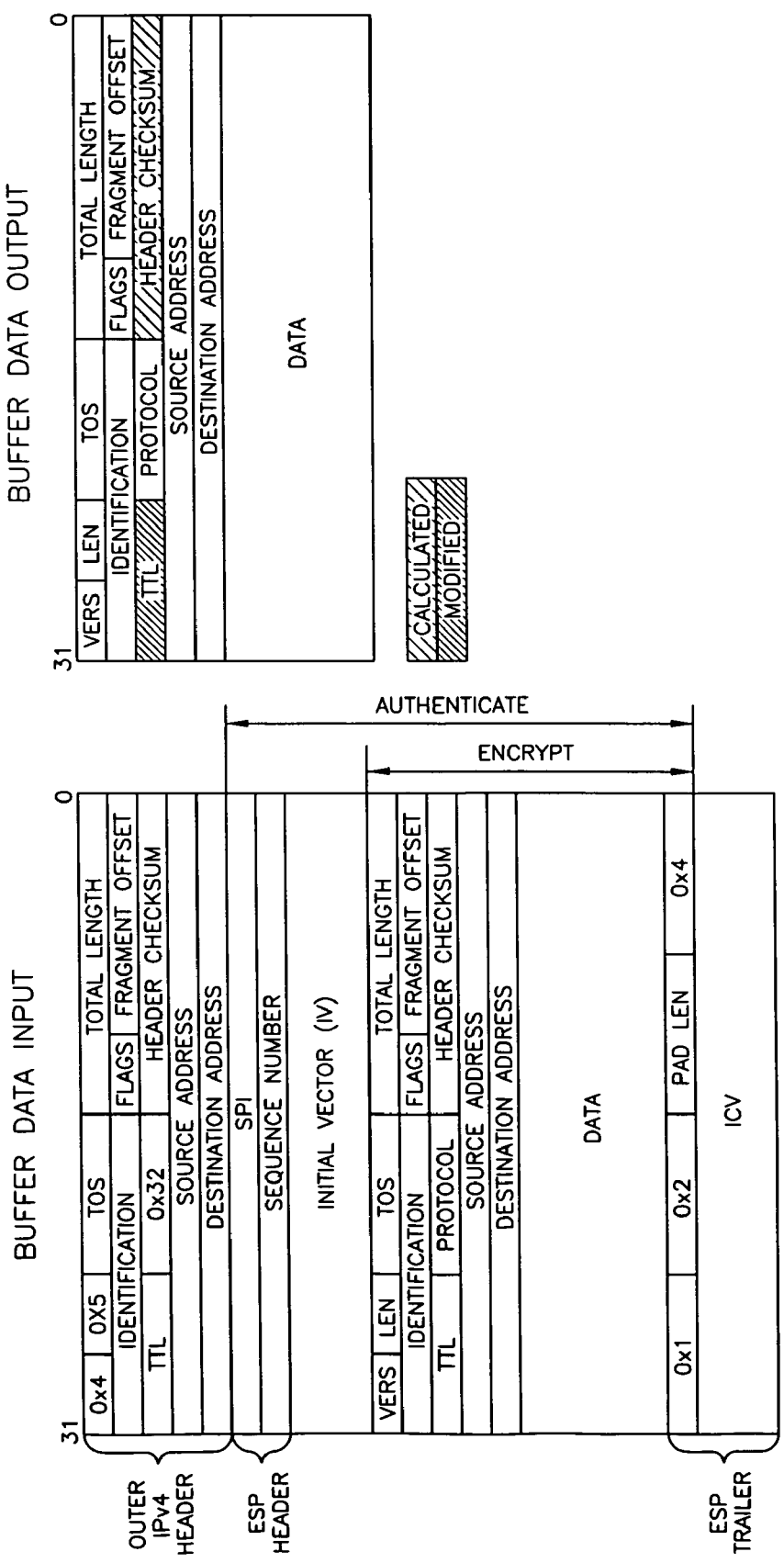

FIGS. 13A and 13B depict embodiments of packet header fields for Ipv4 tunnel mode decapsulation. The security processor can optionally decapsulate inbound tunnel mode packets based on the SAData information. The security processor provides the capability to update the inbound SA information and verify the policy of the decrypted and decapsulated packet. The outer tunnel header and the security header(s) are removed from the packet by the security processor.

In inbound AH tunnel mode the security processor verifies that the ICV value in the AH header matches the calculated ICV for the packet. If the Cap_En bit is set, the outer IPv4 header and the AH header are removed from the packet.

The security processor can optionally decrement the inner IP header TTL (Decrement_TTL=1) and re-calculate the header check-sum during decapsulation. Inner IPv6 headers are handled in the same manner as the inner IPv4 header (Hop Limit decremented based on Decrement_TLL). Outer IPv6 headers are removed in a similar manner as outer IPv4 headers.

In inbound ESP tunnel mode the security processor verifies that the ICV value in the ESP trailer matches the calculated ICV for the packet. The packet is decrypted according to the information in SAData. If the Cap_En bit is set, the outer IPv4 header, ESP header, IV (only removed if Write_IV=1) and ESP trailer are removed from the packet.

The security processor can optionally decrement the inner IP header TTL (Decrement_TTL=1) and re-calculate the header check-sum during decapsulation. Inner IPv6 headers are handled in the same manner as the inner IPv4 header (Hop Limit decremented based on Decrement_TLL). Outer IPv6 headers are removed in a similar manner as outer IPv4 headers.

The security processor provides optional decapsulation of the security headers for transport mode packets.

In inbound AH transport mode the security processor copies the NextHeader field from the AH header into the Protocol field of the IP header (replacing the previous value of AH). The TTL is decremented in the header and the checksum recalculated by the security processor.

The security processor verifies that the ICV value in the AH header matches the calculated ICV for the packet. If the Cap_En bit is set, the AH header is removed from the packet.

Figure 14:
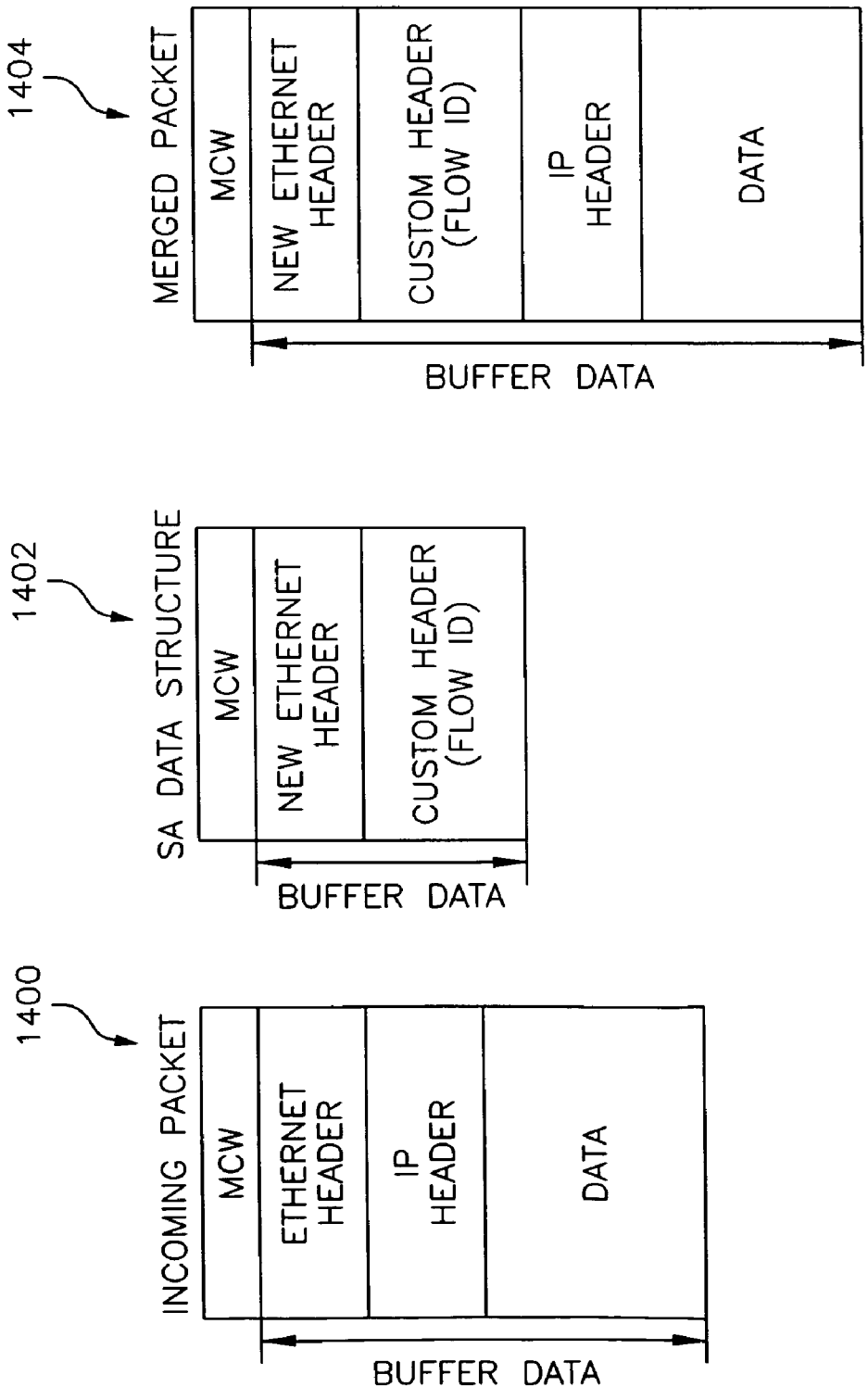
FIG. 14 is a block diagram of one embodiment of packet merging in a system constructed in accordance with the invention.

FIG. 14 depicts one embodiment of merge operations for non-IPsec packets to generate a merged packet 1404. The security processor can process non-IPsec traffic packets 1400 on a separate flow (or SA Data Structure) or in combination with IPsec traffic.

The host may provide an SAUpdate field when processing non-IPsec traffic. If the policy information in the SAUpdate fails, the security processor tags the packet as an error. The MCW can be set to drop the packet, bypass the packet.

A flow for a non-IPsec packet can be configured as BYPASS or DROP using just the MCW as the SA Data Structure 1402. For the BYPASS case, the host may chose to provide PacketContext that contains the result of the flow lookup done by the security processor for this packet. The resulting packet would be forwarded to the host with the PacketContext field included as part of the packet.

For in-band host communication, the SA Data Structure 1402 would include a BufferData field with an Ethernet header and the flow identification that would subsequently be routed to the host.

Figure 15:
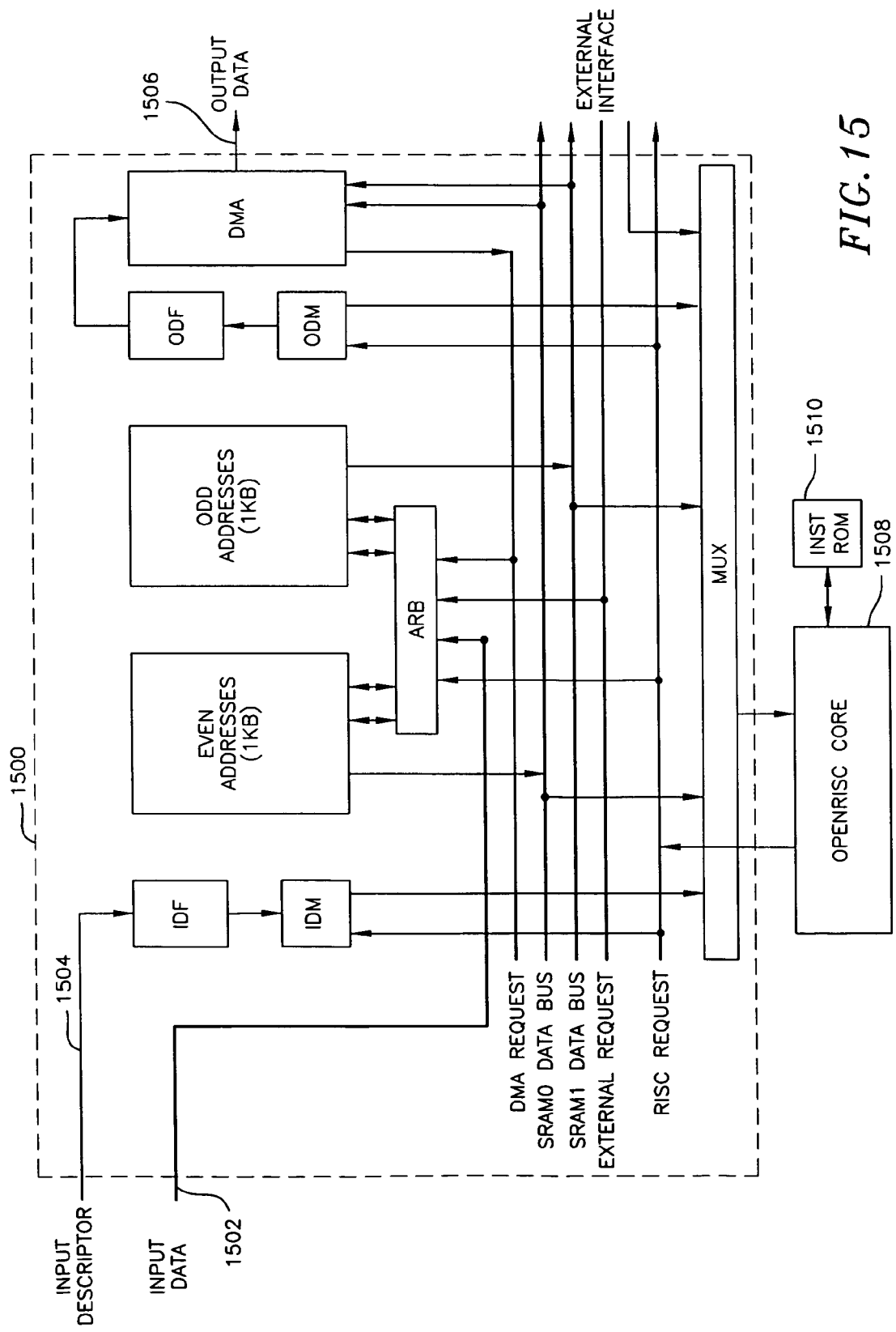
FIG. 15 is a block diagram of one embodiment of a processor interface block in a system constructed in accordance with the invention.

FIG. 15 depicts one embodiment of a processor interface block. The processor interface block ("PIB") is used for packet encapsulation and packet decapsulation in the security processor. The PIB allows a processor (RISC) core to modify packets as they flow through a FIFO.

The processor interface block is an RTL wrapper that communicates with the RISC engine. Packets are written into a 2-kilobyte buffer to be modified by the RISC engine. Free memory space can be inserted so that extra fields can be added to the output packet for encapsulation and fragmentation. For packet fragmentation, PIB supports a region lock feature such that it does not over-write the designated part of the 2 kB buffer with input packet data. After RISC finished processing, the modified packets are read from the buffer and sent to the next module. The PIB also includes External Interface supporting RISC (master) access and data buffer (target) access. It is used for low bandwidth application is such as checksum calculation.

The 2 kB odd/even-word memories are split into two 1 kB dual-ported memories. Each word of a packet is alternately written into the odd or even-word 1 kB memories by the IPU/OPU wrappers. The memories are byte-addressable so that they can support byte, half-word and word memory accesses. Four sources arbitrate for these four memory ports.

The RISC engine issues load and store commands.

The IPU/OPU block writes packets into the memory.

The DMA reads packets from memory and sends them out.

The External Interface reads/writes from/to memory when calculating the IP checksum and IP options.

By design the four sources will not access the same memory addresses. However, the four sources may all attempt to access the same 1 kB of memory. When this occurs, only two sources will gain access to the memory. The odd-word/even-word memory partition reduces the probability of long-lasting collisions.

When used in the IPU wrapper, the RISC and IPU packet writes are given priority in arbitration over the External Interface and the DMA engine. When used in the OPU wrapper, the RISC and the DMA engine are given priority in arbitration over the External Interface and OPU packet writes.

The justification for this priority scheme is described below:

The RISC core does not support variable-latency loads/stores and can never be stalled without causing functional errors. In addition, the number of RISC cycles/packet is very short and should not be wasted in arbitration.

Priority should be given to the higher bandwidth interface. In the IPU wrapper, the DIU-to-IPU interface must support 2.4 Gbps and the IPU-to-SPU interface must support 600 Mbps. In the OPU wrapper the OPU-to-DRU interface must support 2.4 Gbps and the SPU-to-OPU interface must support 600 Mbps.

Figure 16:
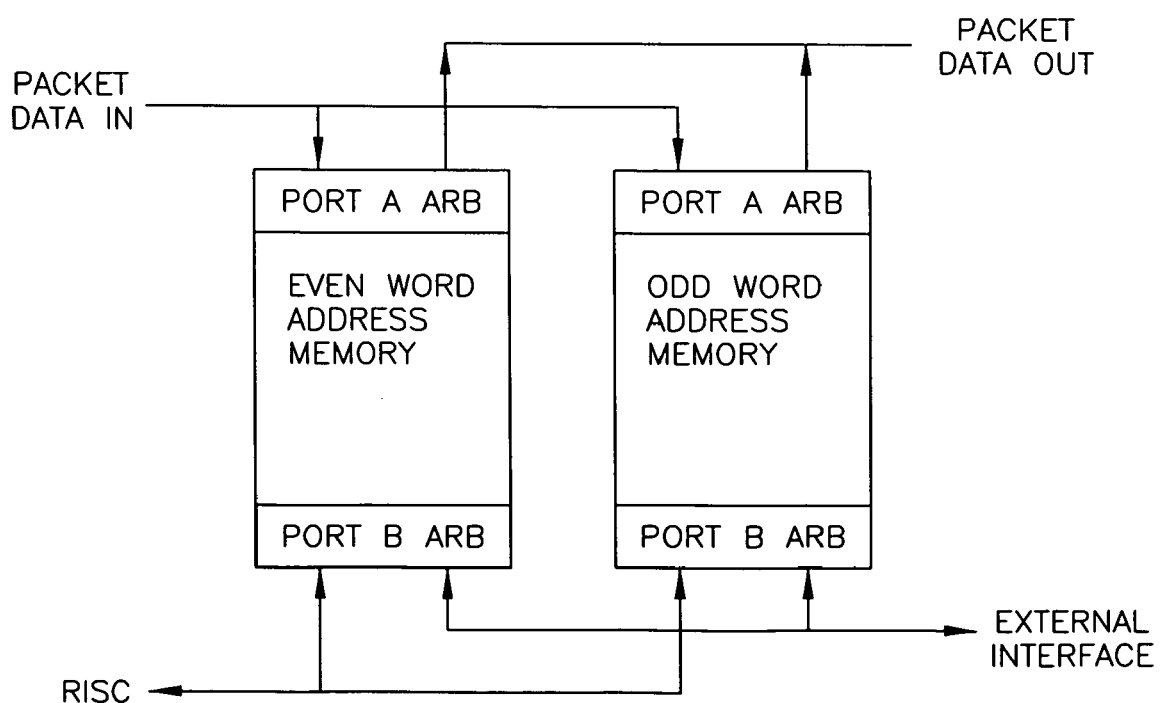
FIG. 16 is a block diagram of one embodiment of dual-port memories constructed in accordance with the invention.

Based on the priority scheme, the dual-port memories (FIG. 16) are set up as follows:

The Port A Arbiters give priority to packet data input for IPU (or packet data output for OPU) when both input packet and output packet are trying to access the same memory. For the majority of accesses, alternate memory addresses (even, odd, even, odd, . . . ) are read/written. Consequently, after the lower priority access is stalled for one cycle in case of conflict, the interfaces will be accessing different memories at any given time.

The Port B Arbiters give priority to RISC accesses over External Interface accesses. While these accesses are more sporadic than either packet data input or packet data output accesses, their bandwidth requirements are significantly lower and well within the memories' limit.

These memories support the following memory allocation and de-allocation schemes. These schemes allow the RISC processor to spend fewer cycles handling descriptors.

Field Removal: In a standard FIFO, every word that is written into the FIFO is read out. In this memory, every word that is written is not read out. This scheme allows the IPU and OPU to remove fields. For example, the IPU and OPU must always remove the SAU field. The RISC core does not write an Output Descriptor for the SAU field. When the next Output Descriptor is written (SAD descriptor), the SAU field memory is automatically de-allocated.

Field Re-ordering: In a standard FIFO, the first word in is always the first word out. This scheme allows words to be re-ordered. The RISC core may write an Output Descriptor to one of the two addresses: one to de-allocate buffer space while PIB is sending the data out, and one not to de-allocate until that of a later Output Descriptor is de-allocated. When re-ordering fields, the RISC core is responsible for sending the Output Descriptor to the correct address. For example, IPU must insert the bdata_encap field inside of the first buffer data field for transport-mode packets. The diagram below illustrates how the wrapper and the RISC core work together to support field reordering:

| Input Descriptor Order | Output Descriptor Order |
|---|---|
| A | B (don't de-allocate) |
| B | A (de-allocate) |
| C | C (de-allocate) |

The Output Descriptor for field B is sent to the "No De-allocation" address. Otherwise, field A would be removed and could be overwritten before being read. The Output Descriptor for field A is sent to the address that de-allocates memory. As field A is read out, each word is de-allocated. The Output Descriptor for field C is sent to the memory address that de-allocates memory. Field B is de-allocated and as field C is read out each word is de-allocated.

Fragmentation support: The RISC core may write a Lock Descriptor to lock a contiguous region of the buffer space. After a region is locked, PIB will not over-write the designated region with new packet data. No data output is associated with a Lock Descriptor. This feature is to support packet fragmentation when a single input packet spawns multiple output fragments. In such case, the header fields from the input packet are replicated (with minimal modifications) in all the output fragments. The specific region in the memory buffer needs to be locked and is then prevented from being de-allocated. After the RISC core finishes updating the last output packet fragment, it unlocks the region by setting Unlock Region command in an Output Descriptor. PIB supports only one (1) lock region at any time. The RISC core needs to unlock a region before it locks another one.

The IPU/OPU writes descriptors into the Input Descriptor FIFO (IDF). There are three categories of descriptors:

Field Descriptors are written into the IDF by the IPU/OPU after the field has been completely written into the 2 kB memory.

Free Space Descriptors are written into the IDF by the IPU/OPU once there is enough room in the 2 kB memory for the free space to be allocated. The PIB indicates the number of available words in the 2 kB memory. Free space is not initialized in memory. This decreases the overhead of reserving free space for a packet.

Jump Descriptors describe jump addresses for the RISC engine. The code_jump Descriptor is a special type of Jump Descriptor that acts as a semaphore between IDM and the RISC engine.

Each Input Descriptor is associated with a field index (din_desc_idx), which is used by the RISC core to access the specific descriptor at a pre-determined address.

The Input Descriptor Memory (IDM) consists of fixed addresses that may be read and written by the RISC engine. Each address contains a descriptor that describes a part of the packet. This reduces the time that the RISC engine spends parsing control structures.

After the RISC core read a specified Input Descriptor, it checks for a non-zero value to indicate the descriptor is valid. For Field type descriptors, it may simply check whether the length field is zero or not.

The IDM is double-buffered to avoid delays when the RISC engine switches processing from the current packet to the next packet. Once the last descriptor for the current packet is written into the current block of IDM, the next packet's descriptors are written into the next IDM buffer.

A typical interaction between IDF, IDM and the RISC engine for a packet is described below:

1. Input Descriptors are read from IDF and copied to the addresses in the current IDM buffer based on the descriptor's type.
2. The code_jump Descriptor is read from the IDF and is copied to its address in the current IDM buffer. This descriptor acts as a semaphore between the IDM and the RISC engine. The RISC engine polls this descriptor until it is valid. The RISC engine begins execution at the instruction address that was written by the wrapper.
3. Field and Free Descriptors are read from the IDF and copied to the correct address in the current IDM buffer. The IDM will not copy a descriptor from the IDF to a descriptor space that already contains a valid descriptor. A descriptor becomes invalid when the RISC engine accesses the entire 32-bit descriptor. A descriptor does not become invalid when the RISC engine accesses a byte or half-word. Once a descriptor become invalid, IDF is free to over-write it with another one of the same type.
4. After the last descriptor is read from the IDF, the next packet's descriptors are written into the next IDM buffer.
5. The RISC engine writes to the code_jump Descriptor address in the current IDM buffer. Future RISC accesses will be directed to the next IDM buffer.

ODM responds to Output Descriptor and Lock Descriptor accesses from the RISC core, merges Output Descriptors if possible, and sends them serially to Output Descriptor FIFO (ODF).

For Output Descriptors, ODM checks whether consecutive ones correspond to contiguous address spaces, merges them into one if so, and sends to ODF. As a result, ODM does not send a merged Output Descriptor to ODF until it can verify the next one is not continuous to the current one. The exception is when the current one has a non-zero command field, then it is sent right away.

The RISC engine needs to have a back-pressure feature such that when ODF is full, PIB can stall the RISC engine from submitting more Output Descriptors. ODF is responsible of transmitting Output Descriptors to DMA as requested.

The DMA engine reads descriptors from ODF. Its basic function is to fetch data from the 2 kB memory and sends them out through the output interface. Unless a region is locked or the RISC has requested no de-allocation, after the data pointed by an Output Descriptor is transmitted, the corresponding buffer space is de-allocated and is free to store new input packet data. In addition, it decodes embedded command, and generates the side-band signals.

DMA supports the following functions as triggered by various flags.

Region Lock: If instructed, DMA locks up a contiguous region in the 2 kB memory buffer. As a result, PIB will not write input packet data words to it. When the write pointer reaches the address preceding to the region, it will jump to the region's subsequent address for the next data. This is to support the fragmentation feature. The locked region stores the fields common to all the fragments. After the RISC core finishes processing the last fragment, it notifies PIB of unlocking the region to store input packet data.

Output Data Send Notify: This is to be utilized with the region lock feature to perform packet fragmentation. After DMA sends out the data designated by an Output Descriptor, if the RISC engine has set Notify after Sent command, DMA asserts Output Data Sent Done register bit to notify the RISC core, which will then alter the content and submit another Output Descriptor for the modified data. The bit resets itself after being read by the RISC core.

Side-band Signals: The RISC core may set End of Fragment command and/or Packet Error bit in an Output Descriptor, and DMA then generates corresponding side-band signals. Moreover, if the RISC core writes the Output Descriptor to the EOP indication address, PIB asserts dout_pkt_sync (active-low) when sending out the corresponding packet data.

Delayed Memory De-allocation: This is to support field re-ordering. If the RISC core writes an Output Descriptor to the "No De-allocation" address, DMA does not de-allocate the corresponding memory space until the next one (with the flag not set) is de-allocated.

The following is an example of how fragmentation is done. Suppose IPU/OPU is sending the following Input Descriptors to PIB.

| Desc | Cat | Type | Address | Length |
|---|---|---|---|---|
| 1 | Field | Header | 0x0000 | 12 |
| 2 | Free | Pseudo Status Word | 0x000C | 4 |
| 3 | Field | Payload #1 | 0x0010 | 16 |
| 4 | Field | Payload #2 | 0x0020 | 16 |
| 5 | Field | Payload #3 | 0x0030 | 16 |
| 6 | Field | Status Word | 0x0040 | 4 |

PIB transfers the above descriptors to their corresponding space in IDM. The descriptors #3, #4, and #5 are of the same type so they will be serially accessed at the same address. The RISC core performs fragmentation by writing the following Output Descriptors to ODM.

| Desc | Cat | Type | Address | Length | Comments |
|---|---|---|---|---|---|
| 1 | Lock | | 0x0000 | 16 | This locks up the region to store Header and Pseudo Status Word. No output data is sent. |
| 2 | Field | Header | 0x0000 | 12 | RISC sets Notify after Sent command. |
| 3 | Field | Payload #1 | 0x0010 | 16 | |
| 4 | Field | Pseudo Status Word | 0x000C | 4 | RISC sets End of Fragment command. |
| | | | | | The RISC engine waits until Output Data Sent Done bit is asserted, and modifies Header data. |
| 5 | Field | Header | 0x0000 | 12 | RISC sets Notify after Sent command. |
| 6 | Field | Payload #2 | 0x0020 | 16 | |
| 7 | Field | Pseudo Status Word | 0x000C | 4 | RISC sets End of Fragment command. |
| | | | | | The RISC engine waits until Output Data Sent Done bit is asserted, and modifies Header data. |
| 8 | Field | Header | 0x0000 | 12 | RISC sets Unlock Region command. |
| 9 | Field | Payload #3 | 0x0030 | 16 | |
| 10 | Field | Status Word | 0x0040 | 4 | RISC sets End of Fragment command and writes to EOP address. |

External Interface is composed of two access pipes. As a master, RISC may initiate read/write transactions from/to the external bus through External Interface. Moreover, a node on the external bus may initiate accesses on PIB 2 kB data memory (target) through the second pipe. PIB does all necessary address translations between internal address space and external bus address.

It should be appreciated that the inventions described herein are applicable to and may utilize many different protocols and standards and modifications and extensions of those protocols and standards including, for example and without limitation, IP, TCP, UDP, ICMP, IPsec, SSL and FCsec. Moreover, a variety of cryptographic and signature algorithms and modifications and extensions thereof may be used. The invention may be practiced using tunnel mode and/or transport mode packet processing.

It should also be appreciated that the inventions described herein may be constructed using a variety of physical components and configurations. For example, a variety of hardware and software processing components may be used to implement the functions of the host processors, security processors, network processors and the Ethernet processors/controllers and the other components and processes described herein. These hardware and software components include, without limitation, processors and associated data memory, state machines and logic and may involve execution of software, firmware or other code. Such components may be combined on one or more integrated circuits. For example, several of these components may be combined within a single integrated circuit. Some components may be implemented as a single integrated circuit. Some components may be implemented using several integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings may, for example, comprise a data network. In addition, these connections may be made with physical wire, fiber and/or wireless connections, for example.

A wide variety of devices may be used to implement the data memories (e.g., the databases and non-volatile memories) discussed herein. For example, a data memory may comprise one or more RAM, disk drive, SDRAM, FLASH or other types of data storage devices.

The invention may be practiced using different types of cipher engines. For example, in one embodiment of the invention data is decrypted using a block cipher, rather than a stream cipher.

In summary, the invention described herein teaches improved packet processing techniques. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of generating secure packets for a plurality of flows comprising:
for each flow, generating a flow header;
storing the plurality of flow headers in a memory;
receiving a plurality of data packets associated with a flow in the plurality of flows;
retrieving the flow header associated with the flow from the memory; and
for each data packet, combining the retrieved flow header with the data packet to generate a secure packet in the flow.

2. The method of claim 1 further comprising:
sending the plurality of generated flow headers to a security processor.

3. The method of claim 2 wherein the step of sending comprises:
sending a flow header and an associated flow identifier to the security processor.

4. The method of claim 3 further comprising the step of identifying, in the security processor, the flow associated with the received flow header.

5. The method of claim 1 wherein the generating step further comprises for each flow, generating a security association for the flow.

6. The method of claim 1 wherein the generating step comprises for each flow, generating the flow header for the flow when the flow is established.

7. The method of claim 1 further comprising:
encapsulating the retrieved flow header and data packet in the secure packet.

8. The method of claim 7 further comprising:
sending the secure packet including the encapsulated flow header and data packet over a packet network.

9. The method of claim 1 further comprising the step of processing the plurality of data packets, the processing step consisting of one of the group of authenticating, encrypting and decrypting.

10. The method of claim 1 further comprising the step of, following the combining step, adding data to at least one field in the retrieved flow header of the secure packet.

11. The method of claim 1 wherein the retrieving step comprises retrieving the flow header associated with the flow according to address information received with the data packets.

12. The method of claim 1, further comprising:
performing security processing on the combined flow header and data packet.

13. The method of claim 12, further comprising:
modifying a field in the flow header as a result of the security processing.

14. The method of claim 1, further comprising:
performing IPsec processing on the combined flow header and data packet.

15. The method of claim 14, further comprising:
appending an encapsulating security payload header to the processed combination of the flow header and data packet.

16. The method of claim 15, further comprising:
appending an outer header to the processed combination of the flow header and data packet.

17. The method of claim 1, further comprising:
after the generating step, generating a configuration packet including a generated flow header.

18. A method, in a secure processor, for generating secure packets for a plurality of flows comprising:
for each flow, receiving a flow header for the flow;
storing the plurality of flow headers in a memory;
receiving a plurality of data packets associated with a flow in the plurality of flows;
retrieving the flow header associated with the flow from the memory; and
for each data packet, combining the retrieved flow header with the data packet to generate a secure packet in the flow.

19. The method of claim 18 further comprising the step of processing the plurality of data packets, the processing step consisting of one of the group of authenticating, encrypting and decrypting.

20. The method of claim 18 further comprising the step of, following the combining step, adding data to at least one field in the retrieved flow header of the secure packet.

21. The method of claim 18, further comprising:
performing security processing on the combined flow header and data packet.

22. The method of claim 21, further comprising:
modifying a field in the flow header as a result of the security processing.

23. The method of claim 18, further comprising:
performing IPsec processing on the combined flow header and data packet.

24. The method of claim 23, further comprising:
appending an encapsulating security payload header to the processed combination of the flow header and data packet.

25. The method of claim 24, further comprising:
appending an outer header to the processed combination of the flow header and data packet.

26. A packet processing system comprising:
a processor for generating a plurality of flow headers associated with a plurality of flows, wherein each flow has an associated flow header, and for communicating a plurality of data packets associated with a flow to a security processor; and
a memory for storing the plurality of flow headers;
wherein the security processor is configured to receive the data packets, retrieve the flow header associated with a flow from the memory, and combine, for each data packet, the flow header and the data packet to generate a secure packet in the flow.

27. The packet processing system of claim 26 wherein the processor includes a media access controller for transferring the plurality of flow headers and the data packets from the processor to the security processor.

28. The packet processing system of claim 26, wherein the security processor comprises:
  a policy lookup unit for retrieving security association data for data packets in a flow; and
  a merge data unit for merging retrieved security association data for a flow with a data packet in the flow.

29. The packet processing system of claim 26, wherein the security processor comprises:
  an IPsec processor.

* * * * *